(12) United States Patent
Obu et al.

(10) Patent No.: US 8,211,519 B2
(45) Date of Patent: Jul. 3, 2012

(54) COMPOSITION FOR FORMING GAS-BARRIER MATERIAL, GAS-BARRIER MATERIAL, A METHOD OF PRODUCING THE SAME, AND GAS-BARRIER PACKING MATERIAL

(75) Inventors: Yusuke Obu, Kanagawa (JP); Hiroshi Sasaki, Kanagawa (JP); Kashiko Kawai, Kanagawa (JP); Hideki Masuda, Kanagawa (JP); Hideki Matsuda, Kanagawa (JP); Naoki Horike, Kanagawa (JP); Takahiro Hidaka, Kanagawa (JP); Koichi Tamura, Kanagawa (JP)

(73) Assignees: Toyo Seikan Kaisha, Ltd., Tokyo (JP); Kansai Paint Co., Ltd., Hyogo (JP)

( * ) Notice: Subject to any disclaimer, the term of this patent is extended or adjusted under 35 U.S.C. 154(b) by 316 days.

(21) Appl. No.: 12/518,209

(22) PCT Filed: Jan. 9, 2008

(86) PCT No.: PCT/JP2008/050120
§ 371 (c)(1), (2), (4) Date: Jun. 8, 2009

(87) PCT Pub. No.: WO2008/084802
PCT Pub. Date: Jul. 17, 2008

(65) Prior Publication Data
US 2010/0015449 A1 Jan. 21, 2010

(30) Foreign Application Priority Data

Jan. 11, 2007 (JP) ................................ 2007-003725
May 11, 2007 (JP) ................................ 2007-126899

(51) Int. Cl.
*B32B 27/08* (2006.01)
*B32B 27/18* (2006.01)
*B32B 27/26* (2006.01)
*B32B 27/30* (2006.01)
*B32B 27/40* (2006.01)

(52) U.S. Cl. .................... 428/36.6; 428/35.8; 428/36.7; 428/423.1; 428/424.2; 428/424.4; 428/522; 524/107; 524/449

(58) Field of Classification Search ........................ None
See application file for complete search history.

(56) References Cited

U.S. PATENT DOCUMENTS
3,962,368 A * 6/1976 Herwig et al. ................ 525/444
(Continued)

FOREIGN PATENT DOCUMENTS
JP 9-151264 6/1997
(Continued)

OTHER PUBLICATIONS

Schimtz, Peter et al., "Films." Ullmann's Encyclopedia of Industrial Chemistry, 5th Ed., vol. A11 (1988), pp. 85-110.*

(Continued)

*Primary Examiner* — Vivian Chen
(74) *Attorney, Agent, or Firm* — Greenblum & Bernstein, P.L.C.

(57) ABSTRACT

A composition for forming a gas-barrier material, comprising a polycarboxylic acid-type polymer (A) and at least a bifunctional alicyclic epoxy compound (B). The composition for forming a gas-barrier material features excellent gas-barrier property, retort resistance and flexibility, can be cured at a low temperature in a short period of time without affecting the plastic base material, and contributes to improving the productivity.

23 Claims, 2 Drawing Sheets

U.S. PATENT DOCUMENTS

| | | | |
|---|---|---|---|
| 4,026,872 A * | 5/1977 | Saida et al. | 525/484 |
| 4,829,124 A * | 5/1989 | Clark | 525/108 |
| 5,096,936 A * | 3/1992 | Seko et al. | 522/31 |
| 5,212,252 A * | 5/1993 | Aoki et al. | 525/327.3 |
| 5,326,827 A * | 7/1994 | Aoki et al. | 525/337 |
| 5,411,999 A * | 5/1995 | Gallucci | 523/436 |
| 6,166,100 A | 12/2000 | Hiwara et al. | |
| 6,605,344 B1 | 8/2003 | Ohba et al. | |
| 6,855,748 B1 * | 2/2005 | Hatton | 522/168 |
| 6,982,119 B2 * | 1/2006 | Shi et al. | 428/413 |
| 2004/0106692 A1 | 6/2004 | Yamamura et al. | |
| 2011/0091743 A1 * | 4/2011 | Obu et al. | 428/689 |

FOREIGN PATENT DOCUMENTS

| | | | |
|---|---|---|---|
| JP | 2000-000931 | | 1/2000 |
| JP | 2001-164174 | * | 6/2001 |
| JP | 2001-310425 | * | 11/2001 |
| JP | 2002-210207 | | 7/2002 |
| JP | 2002-240207 | * | 8/2002 |
| JP | 2003-171419 | * | 6/2003 |
| JP | 2004-115776 | | 4/2004 |
| JP | 2004-277540 | * | 7/2004 |

OTHER PUBLICATIONS

Supplementary European Search Report issued with respect to EP Application No. 08702991.4, dated Aug. 19, 2011.

David James, Pia Appelkvist, Eva Gustaysson: "New Raw materials for cationic UV/EB curing" www.perstorp.com, 2006, XP002655154, Retrieved from the Internet: URL: http://www.perstorp.com/upload/new_raw_materials_for_cationic_uveb.pdf [retrieved on Aug. 2, 2011].

* cited by examiner

COMPOSITION FOR FORMING GAS-BARRIER MATERIAL, GAS-BARRIER MATERIAL, A METHOD OF PRODUCING THE SAME, AND GAS-BARRIER PACKING MATERIAL

TECHNICAL FIELD

This invention relates to a composition for forming a gas-barrier material by using a polycarboxylic acid-type polymer and a crosslinking agent which comprises a compound having a particular functional group. More specifically, the invention relates to a composition for forming a gas-barrier material which can be cured at a low temperature in a short period of time, and has excellent gas-barrier property, retort resistance and flexibility, to a gas-barrier material and a method of producing the same, and to a packing material using the gas-barrier material.

BACKGROUND ART

A variety of gas-barrier resins have heretofore been used. Among them, polyvinylidene chlorides, polyacrylonitriles and ethylene/vinyl alcohol copolymers have been particularly known as gas-barrier resins. However, use of the polyvinylidene chlorides and polyacrylonitriles has been refrained from the environmental point of view while the ethylene/vinyl alcohol copolymers are much dependent for their gas-barrier property on the humidity permitting the gas-barrier property to decrease under highly humid conditions.

A film obtained by depositing an inorganic material on the surface of a base material has also been known to impart gas-barrier property to the packing material. However, the film is very expensive. Besides, the film on which the inorganic material is deposited has poor flexibility and poor adhesive property to the base material or to other resin layers.

In order to solve the above problem, there have been proposed a gas-barrier film obtained by forming, on the base material, a film comprising a water-soluble high molecular material A, a water-soluble or water-dispersing high molecular material B and an inorganic lamellar compound (patent document 1), a gas-barrier film obtained by applying a layer that contains a metal compound onto the surface of a layer comprising a mixture of a poly(meth)acrylic acid-type polymer and polyalcohols (patent document 2), and a gas-barrier coating material (patent document 3) containing a polyvinyl alcohol, an ethylene/maleic acid copolymer, and a divalent or more highly valent metal compound.

There have further been proposed a gas-barrier resin composition obtained by reacting a polycarboxylic acid-type polymer, a crosslinking agent having 2 to 4 functional groups that react with the carboxyl group, and divalent or more highly valent metal ions, so that the polycarboxylic acid-type polymer forms the crosslinked portions due to the crosslinking agent and the crosslinked portions due to the divalent or more highly valent metal ions, and that the weight ratio of the polycarboxylic acid-type polymer and the crosslinking agent is from 99.9/0.1 to 65/35 (patent document 4), and a gas-barrier film obtained by forming a gas-barrier layer on at least one surface of a thermoplastic resin film, the gas-barrier layer being formed of a polyacrylic acid crosslinked with a crosslinking agent containing an epoxy compound that has not less then 3 epoxy groups per a molecule, the crosslinking agent being contained in an amount of 1 to 100 parts by mass per 100 parts by mass of the polyacrylic acid (patent document 5).

Patent document 1: JP-A-9-151264
Patent document 2: JP-A-2000-931
Patent document 3: JP-A-2004-115776
Patent document 4: JP-A-2003-171419
Patent document 5: JP-A-2002-210207

DISCLOSURE OF THE INVENTION

Problems to be Solved by the Invention

The gas-barrier materials disclosed in the above patent documents 1 to 5 may exhibit improved gas-barrier properties under highly humid conditions, but are not still capable of satisfying a multiplicity of requirements as packing materials and are not satisfactory yet.

That is, the gas barrier film disclosed in the patent document 1 contains the inorganic lamellar compound that is simply dispersed in the film. To obtain excellent gas-barrier property, therefore, the inorganic lamellar compound must be added in large amounts accompanied by such problems as decreased mechanical strength and poor retort resistance. The gas-barrier film disclosed in the patent document 2 must be heat-treated at a high temperature and for a long period of time for forming the coating. The gas-barrier coating material disclosed in the patent document 3, too, must be heat-treated at a high temperature when the film thereof is to be cured within a short period of time. Further, the gas-barrier materials disclosed in the patent documents 2 and 3 thermally affect the plastic base material to a large extent and are accompanied by a problem from the standpoint of productivity.

The gas-barrier resin composition disclosed in the patent document 4 must be heated at a temperature as high as 150° C. or more or for an extended period of time for forming a film thereof, seriously affecting the plastic base material and leaving a problem from the standpoint of productivity and flexibility which is not satisfactory yet. Further, the gas-barrier film disclosed in the patent document 5, too, must be heated at a temperature as high as 150° C. or more, still exhibiting poor flexibility and is not satisfactory yet even from the standpoint of retort resistance.

It is, therefore, an object of the present invention to provide a composition which is capable of forming a gas-barrier material having excellent gas-barrier property, retort resistance and flexibility, can be cured at a low temperature in a short period of time without affecting the plastic base material, and contributes to improving the productivity.

Another object of the present invention is to provide a method of producing the above gas-barrier material and a packing material using the above gas-barrier material.

Means for Solving the Problems

The present invention provides a composition for forming a gas-barrier material, comprising a polycarboxylic acid-type polymer (A) and at least a bifunctional alicyclic epoxy compound (B).

In the composition for forming a gas-barrier material of the invention, it is desired that:

1. The alicyclic epoxy compound (B) is contained in an amount of 0.1 to 20 parts by weight per 100 parts by weight of the polycarboxylic acid-type polymer (A);
2. The polycarboxylic acid-type polymer (A) is a poly(meth)acrylic acid or a partly neutralized product thereof;
3. The alicyclic epoxy compound (B) is a compound having an epoxycyclohexyl group;
4. The alicyclic epoxy compound (B) is a compound represented by the following formula (1),

[Formula 1]

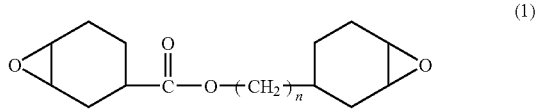

(1)

wherein n is an integer of 1 to 10;
5. A compound (C) is further contained forming an ether bond with a carbon atom that is forming a double bond with a nitrogen atom, and having two ring structures (c) including an oxygen atom in the ether bond;
6. The compound (B) is contained in an amount of 0.01 to 20 parts by weight and the compound (C) is contained in an amount of 0.01 to 60 parts by weight per 100 parts by weight of the polycarboxylic acid-type polymer (A);
7. The compound (C) is a 2,2'-bis(2-oxazoline);
8. A dehydrating agent (D) is contained in an amount of 1 to 100 parts by weight per 100 parts by weight of the polycarboxylic acid-type polymer (A); and
9. The dehydrating agent (D) is a methyl orthoformate and/or a methyl orthoacetate.

According to the present invention, there are further provided a gas-barrier material comprising the above composition for forming a gas-barrier material and in which a crosslinked structure is formed by the reaction of a carboxyl group of the carboxylic acid-type polymer (A) in the composition for forming a gas-barrier material with an epoxy group of the alicyclic epoxy compound (B), and a gas-barrier material in which a crosslinked structure is formed by the reaction of a carboxyl group of the carboxylic acid-type polymer (A) with an epoxy group of the alicyclic epoxy compound (B), and a crosslinked structure is formed by the reaction of the carboxyl group of the carboxylic acid-type polymer (A) with a ring structure (c) of the compound (C).

In the gas-barrier material of the present invention, it is desired that:
1. Two ester bonds stemming from the alicyclic epoxy group are formed at the crosslinked portion in the crosslinked structure;
2. The ester bonds stemming from the alicyclic epoxy group are the ones stemming from an epoxycyclohexyl group;
3. Two ester bonds stemming from the epoxycyclohexyl group or two amido ester bonds are formed at the crosslinked portion in the crosslinked structure; and
4. The remaining unreacted carboxyl groups are metal ionically crosslinked with polyvalent metal ions.

According to the present invention, there is further provided a method of producing a gas-barrier material by treating the gas-barrier material with water containing a polyvalent metal compound so that the remaining unreacted carboxyl groups are metal ionically crosslinked.

According to the present invention, further, there is provided a packing material having a layer of the above gas-barrier material formed on the surface of a plastic base material or between the plastic layers. In this packing material, it is desired that the layer of the gas-barrier material is formed on the surface of the plastic base material via an anchor layer or at least one surface thereof is provided between the plastic layers via the anchor layer. In particular, it is desired that the anchor layer contains an urethane-type polymer.

By using the composition for forming a gas-barrier of the present invention, a crosslinked structure can be easily formed by heating at a low temperature for a short period of time. Therefore, the production time can be shortened and the amount of energy that is required can be decreased without adversely affecting the plastic base material. Namely, the excellent gas-barrier material can be formed maintaining good productivity.

Further, by using the compound (B) together with the compound (C), the crosslinked structure can be easily formed by heating at a lower temperature for a shorter period of time. Therefore, the production time can be further shortened and the amount of energy that is required can be further decreased without adversely affecting the plastic base material. Namely, the excellent gas-barrier material can be formed maintaining good productivity.

It is further desired that the composition for forming a gas-barrier material of the invention is blended with a dehydrating agent. When the compound (C) is contained, in particular, the dehydrating agent (D) is blended to remove water that deactivates the compound (C) and impairs the crosslinking reaction, without affecting the crosslinking reaction. This suppresses a drop in the curability of the composition for forming a gas-barrier material and makes it possible to greatly improve the storage stability. Owing to the use of the methyl orthoformate and/or the methyl orthoacetate, by-products formed by the reaction of the dehydrating agent (D) with water easily vaporize and extinguish at the time of forming the gas-barrier material. Therefore, excellent performance possessed by the gas-barrier material of the present invention is not impaired.

The gas-barrier material obtained from the composition for forming a gas-barrier material of the present invention features excellent gas-barrier property and water resistance and, further, retort resistance that makes it possible to attain excellent gas-barrier property even after placed under high-temperature and wet heated conditions such as of retort sterilization. Further, the gas-barrier material has excellent flexibility. Even when it is used for the flexible packing material, therefore, the gas-barrier material is not damaged and the gas-barrier property (oxygen-permeating property) does not decrease to impair the use. Moreover, the layer of the gas-barrier material of the invention may be formed on the plastic base material to form a multi-layer pre-formed article.

Moreover, after the crosslinking is formed by the carboxylic acid-type polymer (A), the alicyclic epoxy compound (B) and the compound (C) blended as required, the remaining unreacted carboxyl groups are metal ionically crosslinked making it possible to markedly improve the gas-barrier property under highly humid conditions.

An important feature is that the composition for forming a gas-barrier material of the invention contains the polycarboxylic acid-type polymer (A) and at least the bifunctional alicyclic epoxy compound (B).

The basic structure in which the composition for forming a gas-barrier material of the invention forms the gas-barrier material, is that a crosslinked structure is formed as the carboxyl group of the polycarboxylic acid-type polymer (A) reacts with the epoxy group of the alicyclic epoxy compound (B).

That is, if an alicyclic epoxy compound having two epoxycyclohexyl groups is described as the alicyclic epoxy compound, as represented by the following formula (2), the carboxyl group of the polycarboxylic acid-type polymer (A) reacts with the oxylane ring of the alicyclic epoxy compound (B), and a crosslinked structure is formed in which two ester structures stemming from the alicyclic epoxy group is formed at the crosslinked portion of both terminals of the alicyclic epoxy compound (B) and the polycarboxylic acid-type polymer (A), and excellent gas-barrier property is imparted.

[Formula 2]

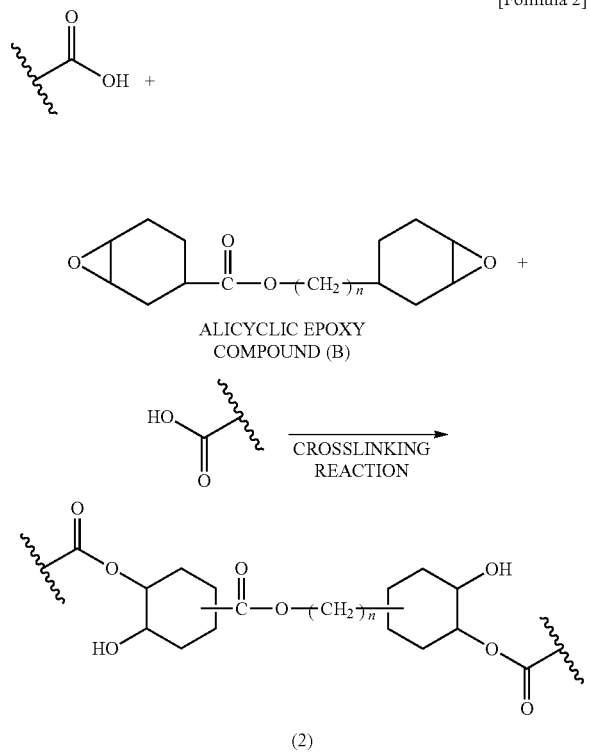

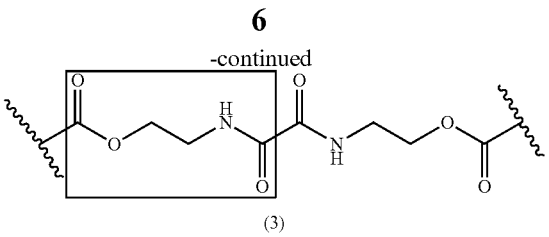

The above gas-barrier material exhibits excellent gas-barrier properties on account of the reasons as set forth below.

(i) Since the polymer which is a chief component is a polycarboxylic acid-type polymer, the carboxyl group on a side chain strongly bonds to a hydrogen atom and produces a strong cohesive force, forming a basic structure exhibiting excellent gas-barrier property.

(ii) An ester bond stemming from the alicyclic epoxy group which is a structure effective in obtaining gas-barrier property is formed by the reaction of a carboxyl group which is a polymer side chain with an alicyclic epoxy group of the alicyclic epoxy compound (B) which is a crosslinking component.

(iii) In particular, use of the bifunctional alicyclic epoxy compound makes it possible to form a densely crosslinked structure having excellent gas-barrier property little permitting the structure of the crosslinked point to spread three-dimensionally.

(iv) Formation of two ester bonds stemming from the alicyclic epoxy group at the crosslinked portion is desired for the crosslinked structure that is effective in obtaining gas-barrier property, and helps further improve water resistance of the crosslinked portion, and an excellent barrier structure can be maintained even after the retort sterilization.

(v) The amide ester bond which is a structure effective in obtaining gas-barrier property is formed by the reaction of the carboxyl group which is a polymer side chain with the ring structure (c) of the compound (C) which is a crosslinking component.

(vi) The number of the ring structures (c) of the compound (C) is two which is a minimum number required for forming the crosslinking and, besides, the compound (B) is mainly bifunctional, making it possible to form a densely crosslinked structure having excellent gas-barrier property little permitting the structure of the crosslinked point to spread three-dimensionally.

(vii) Use of the polycarboxylic acid-type polymer as the chief component enables the unreacted carboxyl groups that were not used for the crosslinking to be metal ionically crosslinked and to further improve gas-barrier property under highly humid conditions and to impart excellent gas-barrier property that is not impaired even under highly humid conditions.

Further, the alicyclic epoxy compound (B) is well compatible with the polycarboxylic acid-type polymer (A) and is highly reactive exhibiting highly curable property even by being added in small amounts and, therefore, imparts excellent flexibility.

Moreover, the crosslinking by the polycarboxylic acid-type polymer (A) with the alicyclic epoxy compound (B) or the compound (C) can be formed by the heating at a low temperature and in a short period of time, little affecting the plastic base material which is used for forming the gas-barrier material and offering an advantage of excellent productivity.

In another embodiment of the composition for forming a gas-barrier material of the present invention, a crosslinked structure is formed by the polycarboxylic acid-type polymer (A) and by at least a bifunctional alicyclic epoxy compound (B), and a crosslinked structure is formed by the polycarboxylic acid-type polymer (A) and by a compound (C) which forms an ether bond with a carbon atom that is forming a double bond with a nitrogen atom, the compound (C) having two ring structures (c) including an oxygen atom in the ether bond, making it possible to provide an excellent gas-barrier material capable of easily forming a crosslinked structure through the heating at a lower temperature for a shorter period of time. The basic structure for forming the gas-barrier material of this embodiment is that the crosslinked structure is formed as represented by the above formula (2) and that a crosslinked structure is formed as the carboxyl group of the polycarboxylic acid-type polymer (A) reacts with the ring structure (c) of the compound (C) as represented by the following formula (3),

[Formula 3]

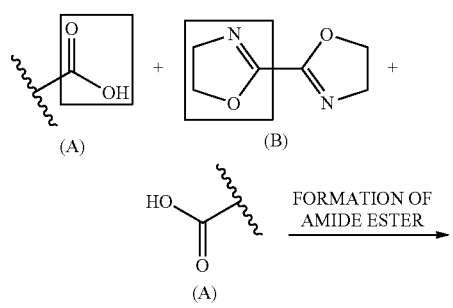

Figure 1:
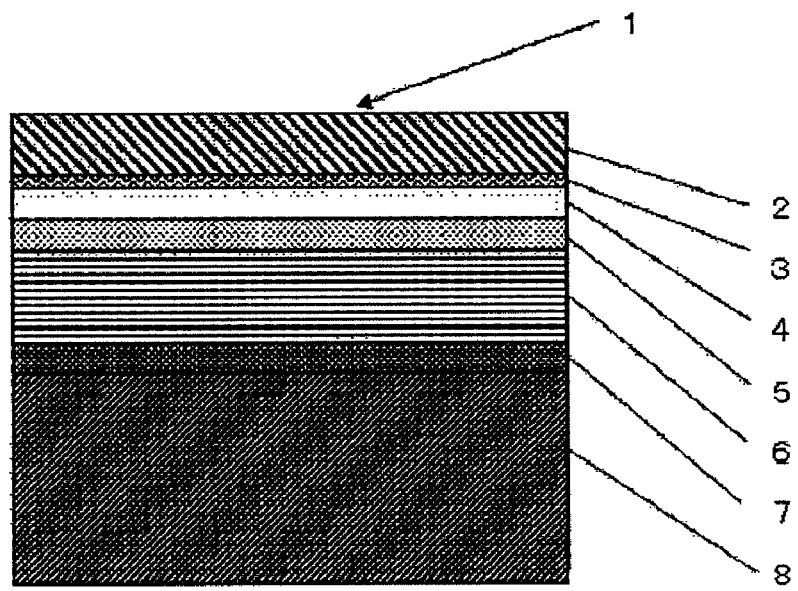
FIG. 1 is a view of the sectional structure of a laminate produced in Examples 1 and 15.

BEST MODE FOR CARRYING OUT THE INVENTION (Composition for Forming a Gas-Barrier Material)
[Polycarboxylic Acid-Type Polymer (A)]

As the polycarboxylic acid-type polymer used for the composition for forming a gas-barrier material of the invention, there can be used homopolymers or copolymers of monomers having a carboxyl group, such as polyacrylic acid, polymethacrylic acid, polymaleic acid, polyitaconic acid, and acrylic acid/methacrylic acid copolymer, or a partly neutralized product thereof. Among them, it is desired to use the polyacrylic acid or polymethacrylic acid.

A partly neutralized product of the polycarboxylic acid-type polymer can be partly neutralized with a metal hydroxide such as sodium hydroxide or potassium hydroxide, or with ammonia.

Though there is no particular limitation, it is desired that the degree of neutralizing of the partly neutralized product is not higher than 30% in terms of a molar ratio to the carboxyl groups. If the neutralizing degree is higher than the above range, bonding of the carboxyl group to the hydrogen atom decreases and the gas-barrier property decreases, too.

Though there is no particular limitation, it is desired that the "weight average molecular weight" of the polycarboxylic acid-type polymer is in a range of 2,000 to 5,000,000 and, particularly, 10,000 to 1,000,000.

The "weight average molecular weight" was measured by using two separation columns, i.e., "TSK G4000PWXL" and "TSK G3000PWXL" (manufactured by Toso Co.), using an aqueous solution of 50 mmols of phosphoric acid as an eluent at 40° C. and at a flow rate of 1.0 ml/min. relying upon a chromatogram and a calibration curve of a standard polycarboxylic acid-type polymer.

It is particularly desired that the polycarboxylic acid-type polymer has a water content of not larger than 15%. It is, therefore, made possible to produce the gas-barrier material of the present invention at a lower temperature and in a shorter period of time being compounded by the blending with the dehydrating agent (D) that will be described later.

The water content can be decreased to be not larger than 15% by, for example, dehydrating the polycarboxylic acid-type polymer by heating or by reducing pressure.

The dehydration treatment will be sufficient if heated in an electric oven at a temperature of 140 to 180° C. for about 5 to about 20 minutes. Any other heating means may be employed, or reducing pressure may be employed or heating under a reduced pressure may be employed.

The water content of the polycarboxylic acid-type polymer can be found by the Karl Fischer's method. The water content found by the Karl Fischer's method varies depending upon the conditions for heating the polycarboxylic acid polymer for vaporizing water. If the heating condition is set to be lower than 200° C., the amount of water (amount of free water) adsorbed by the polycarboxylic acid-type polymer can be grasped but it becomes difficult to find the water content inclusive of the amount of water possessed as constitution water by the polycarboxylic acid-type polymer which strongly bonds to the hydrogen atom. If the temperature exceeds 250° C., on the other hand, the polycarboxylic acid-type polymer may decompose to a conspicuous degree, which is not desirable. To find the water content inclusive of both free water and constitution water, therefore, it is considered that the heating condition is desirably in a range of 200 to 250° C. In the present invention, the water content was found under a heating condition of 230° C. to vaporize water.

[At Least Bifunctional Alicyclic Epoxy Compound (B)]

The composition for forming the gas-barrier material of the present invention uses at least a bifunctional alicyclic epoxy compound (B) as a crosslinking agent for crosslinking the polycarboxylic acid-type polymer.

In the present invention, it is important that the crosslinking agent that is used is the alicyclic epoxy compound (B). This makes it possible to attain excellent gas-barrier property and to form the gas-barrier material at a low temperature and in a short period of time. Besides, the gas-barrier material that is obtained exhibits excellent flexibility.

As the alicyclic epoxy compound (B), there can be used an epoxy compound having an alicyclic group in the molecules thereof and containing an epoxy compound component in which a carbon atom adjacent the alicyclic group is forming an oxirane ring, and having, for example, at least one epoxycycloalkyl group such as epoxycyclohexyl group or epoxycyclopentyl group in the molecules thereof, in a single kind or in combination.

As the alicyclic epoxy compound, there can be exemplified an alicyclic epoxy compound having two epoxycyclohexyl groups in a molecule thereof as will be described later, as well as vinylcyclohexenemonoepoxide, vinylcyclohexenediepoxide and bis(2,3-epoxycyclopentyl)ether.

It is desired that the alicyclic epoxy compound used in the present invention is bifunctional having two epoxy groups in a molecule.

That is, when the bifunctional alicyclic epoxy compound is used, the crosslinked structure little spreads three-dimensionally as compared to when a trifunctional or more highly functional alicyclic epoxy compound is used, and a densely crosslinked structure having excellent gas-barrier property can be formed. Besides, the film that is formed is not so hard or brittle as that of when the polyfunctional alicyclic epoxy compound is used. Therefore, excellent flexibility and satisfactory retort resistance are obtained even after the retort sterilization.

As the bifunctional alicyclic epoxy compound, there can be preferably used an alicyclic epoxy compound having, preferably, an alicyclic epoxy group and, more preferably, an alicyclic group, and having at least one epoxycycloalkyl group and, particularly, an epoxycyclohexyl group in which a carbon atom adjacent the alicyclic group is forming an oxirane ring and, more preferably, having two epoxycyclohexyl groups in one molecule.

This makes it possible to maintain excellent flexibility after the retort sterilization.

Though not limited thereto only, examples of the alicyclic epoxy compound (B) having two epoxycyclohexyl groups in a molecule that can be particularly preferably used in the present invention include:

(3,4-epoxy-6-methylcyclohexyl)methyl-3,4-epoxy-6-methylcyclohexane carboxylate, (3,4-epoxy-6-methylcyclohexyl)methyl-3,4-epoxycyclohexane carboxylate, bis(3,4-epoxycyclohexylmethyl) adipate, bis(3,4-epoxycyclohexyl) adipate, bis(3,4-epoxy-6-methylcyclohexylmethyl) adipate, 3,4-epoxy-6-methylcyclohexane carboxylate, 3,4-epoxy-6-methylcyclohexane carboxylate, and 3,4-epoxycyclohexylmethyl(3,4-epoxy)cyclohexane carboxylate in addition to the alicyclic epoxy compounds represented by the above formula (1).

In the present invention, it is desired that the crosslinked portion formed by the polyacrylic acid polymer (A) and the compound (B) has been formed by an aliphatic chain from the standpoint of mechanical properties and color. Among the above compounds (B), therefore, it is desired to use the one without having an aromatic ring. Among them, it is particularly preferred to use the 3,4-epoxycyclohexylmethyl(3,4-epoxy)cyclohexane carboxylate.

The epoxycyclohexyl group-containing compounds have been placed in the market in the trade names of Cylacure UVR-6100, Cylacure UVR-6105, Cylacure UVR-6110, Cylacure UVR-6128 (the above products are all produced by Dow Chemical Co.), Celoxide 2021, Celoxide 2021P, Celoxide 2081, Celoxide 2083, Celoxide 2085, Celoxide 3000, Epolead GT-300, Epolead GT-301, Epolead GT-302, Epolead GT-400, Epolead 401, Epolead 403 (the above products are all produced by Daicel Kagaku Kogyo Co.), and KRM-2100, KRM-2110 and KRM-2199 (the above products are all produced by Asahi Denka Kogyo Co.).

[Compound C]

In the composition for forming the gas-barrier material of the present invention, the compound (C) that is used together with the alicyclic epoxy compound (B) as a crosslinking agent for crosslinking the polycarboxylic acid-type polymer, forms an ether bond with a carbon atom that is forming a double bond with a nitrogen atom, and has two ring structures (c) including an oxygen atom in the ether bond, i.e., has two ring structures including an oxoimino group that has a group —N═C—O— or a portion ═C—O— in the ring thereof. As the ring structures (c), there can be exemplified the following structures though not limited thereto only.

[Formula 4]

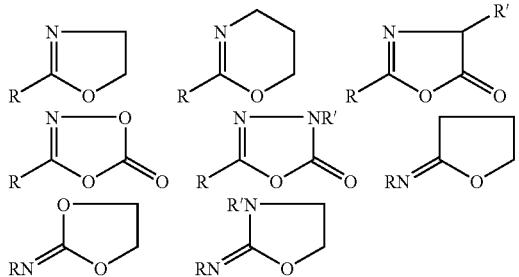

Among the heterocyclic rings represented by the following formula,

[Formula 5]

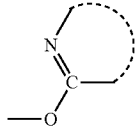

those of the structure without oxygen atom of the ether bond in the ring do not trigger the crosslinking reaction for forming the amido ester bond with the polycarboxylic acid-type polymer. Crosslinking does not take place, either, if there is only one ring structure. If there are three or more ring structures, the structure of the crosslinked point spreads in a three-dimensional manner, and there is formed no densely crosslinked structure having excellent gas-barrier property, which is not desirable. From the above, it is important that the nitrogen atom and the carbon atom are forming a double bond, the carbon atom is forming an ether bond, an ether bond is formed by the carbon atom that is forming a double bond relative to the nitrogen atom and, in addition to that the above conditions are individually holding, the ether bond is formed by the carbon atom that is forming the double bond relative to the nitrogen atom, and there are two ring structures (c) including the oxygen atom in the ether bond.

The compound (C) used for the composition for forming a gas-barrier material of the present invention has two ring structures (c) that are described above. The two ring structures may be the same or different. Here, however, it is desired that at least one of them is an oxazoline group or a derivative thereof.

Though not limited thereto only, examples of the compound (C) having two such ring structures (c) include bisoxazolines such as 2,2'-bis(2-oxazoline),
2,2'-bis(4-methyl-2-oxazoline),
2,2'-bis(5-methyl-2-oxazoline),
2,2'-bis(5,5'-dimethyl-2-oxazoline),
2,2'-bis(4,4,4',4'-tetramethyl-2-oxazoline),
2,2'-p-phenylenebis(2-oxazoline),
2,2'-m-phenylenebis(2-oxazoline),
2,2'-o-phenylenebis(2-oxazoline),
2,2'-p-phenylenebis(4-methyl-2-oxazoline),
2,2'-p-phenylenebis(4,4-dimethyl-2-oxazoline),
2,2'-m-phenylenebis(4-methyl-2-oxazoline),
2,2'-m-phenylenebis(4,4'-dimethyl-2-oxazoline),
2,2'-ethylenebis(2-oxazoline),
2,2'-tetramethylenebis(2-oxazoline),
2,2'-hexamethylenebis(2-oxazoline),
2,2'-octamethylenebis(2-oxazoline),
2,2'-decamethylenebis(2-oxazoline),
2,2'-ethylenebis(4-methyl-2-oxazoline),
2,2'-tetramethylenebis(4,4-dimethyl-2-oxazoline),
2,2'-3,3'-diphenoxyethanebis(2-oxazoline),
2,2'-cyclohexylenebis(2-oxazoline), and
2,2'-diphenylenebis(2-oxazoline); and bisoxazines such as
2,2'-methylenebis(5,6-dihydro-4H-1,3-oxazine),
2,2'-ethylenebis(5,6-dihydro-4H-1,3-oxazine),
2,2'-propylenebis(5,6-dihydro-4H-1,3-oxazine),
2,2'-butylenebis(5,6-dihydro-4H-1,3-oxazine),
2,2'-hexamethylenebis(5,6-dihydro-4H-1,3-oxazine),
2,2'-p-phenylenebis(5,6-dihydro-4H-1,3-oxazine),
2,2'-m-phenylenebis(5,6-dihydro-4H-1,3-oxazine),
2,2'-naphthylenebis(5,6-dihydro-4H-1,3-oxazine), and
2,2'-p,p'-diphenylenebis(5,6-dihydro-4H-1,3-oxazine).

In the present invention, it is desired that the crosslinked portion formed by the polyacrylic acid polymer (A) and the compound (C) has been formed by an aliphatic chain from the standpoint of mechanical properties and color. Among the above compounds (C), therefore, it is desired to use the one without having an aromatic ring. Among them, it is particularly preferred to use the 2,2'-bis(2-oxazoline).

[Dehydrating Agent (D)]

It is desired that the composition for forming the gas-barrier material of the present invention is blended with a dehydrating agent to remove water adsorbed by the polycarboxylic acid-type polymer and to remove water present in a solvent that is used for dissolving, so that water present in the place of reaction will not impair the crosslinking reaction of the polycarboxylic acid-type polymer (A), the alicyclic epoxy compound (B) and the compound (C) which forms an ether bond with a carbon atom that is forming double bond with a nitrogen atom and which has two ring structures (c) including an oxygen atom in the ether bond.

In particular, if water is present in the crosslinking reaction of the polycarboxylic acid-type polymer (A) and the compound (C) that forms an ether bond with a carbon atom that is forming a double bond with a nitrogen atom and has two ring structures (c) including an oxygen atom in the ether bond, then the compound (C) is deactivated, the crosslinking reaction is impaired and curability decreases. It is therefore desired that the dehydrating agent is blended. This improves the storage stability of the composition for forming the gas-barrier material, and the compound (C) can be efficiently reacted with the polycarboxylic acid-type polymer (A) to accelerate the crosslinking reaction.

Described below is a dehydration reaction of when a methyl orthoformate is used as the dehydrating agent (D). Referring to the following formula (4), the products formed by the reaction with the dehydrating agent are a methanol and a methyl formate which easily evaporate under the crosslinking reaction conditions and do not remain in the gas-barrier material that is formed. By using the composition for forming the gas-barrier material of the present invention, therefore, the gas-barrier material that is formed is equivalent to the one that is not blended with the dehydrating agent (D) yet enabling the crosslinked structure to be formed at a lower temperature and in a shorter period of time.

[Formula 6]

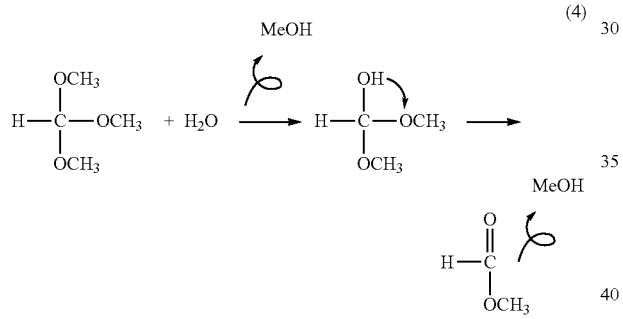

(4)

This will become obvious from the results of Examples appearing later.

That is, a gas-barrier material comprising the composition for forming a gas-barrier material of the invention blended with the dehydrating agent (D) (Example 17) and a gas-barrier material comprising the composition for forming a gas-barrier material cured under the same condition but without blended with the dehydrating agent (Example 15) both exhibit very low extractabilities (%) with methanol, that represent the cured state of the coating. If the two are compared, however, it is obvious that Example 17 is attaining more excellent curability than Example 15.

Further, if Example 16 is compared with Example 19, their extractabilities with methanol are nearly the same but the composition for forming a gas-barrier material of Example 19 is the one blended with the dehydrating agent, and is blended with the 2,2'-bis(2-oxazoline) (compound (C)) in an amount of 30% by weight.

On the other hand, the composition for forming a gas-barrier material of Example 16 is the one that is not blended with the dehydrating agent, but is blended with the 2,2'-bis (2-oxazoline) (compound (C)) in an amount of 60% by weight. The composition of Example 19 which is blended with both the 2,2'-bis(2-oxazoline) (compound (C)) and the dehydrating agent makes it possible to attain a nearly equal extractability with methanol but using the 2,2'-bis(2-oxazoline) in an amount smaller than that of Example 2.

As a result, despite the compound (C) is blended in a decreased amount as in Example 19, the number of effective crosslinking points formed among the molecules of the polycarboxylic acid-type polymer (A) becomes equal to that of Example 16. Therefore, the cohesive force acts more effectively due to hydrogen bonds among the carboxyl groups possessed by the polycarboxylic acid-type polymer (A) or the number of metal ionic crosslinks formed among the remaining carboxyl groups increases to improve the humidity resistance. Therefore, the amount of oxygen permeation decreases as measured in a highly humid environment of a temperature of 25° C. and a relative humidity of 80%.

As the dehydrating agent used for the composition for forming a gas-barrier material of the present invention, any known dehydrating agent can be used. Not being limited thereto, however, the following dehydrating agents can also be used.

(i) Powdery and porous metal oxides or carbides, such as synthetic silica, activated alumina, zeolite, activated carbon;

(ii) Calcium compounds having compositions $CaSO_4$, $CaSO_4 \cdot \frac{1}{2}H_2O$ and $CaO$, such as calcined gypsum, soluble gypsum and quick lime;

(iii) Metal alkoxides such as aluminum isopropylate, aluminum sec-butylate, tetraisopropyl titanate, tetra-n-butyl titanate, zirconium 2-propylate, zirconium n-butylate, ethyl silicate and vinyltrimethoxysilane;

(iv) Monofunctional isocyanates such as Additive TI (trade name, manufactured by Sumika-Bayer Urethane Co.); and (v) Organic alkoxy compounds such as an organic alkoxy compound represented by the following formula (5),

[Formula 7]

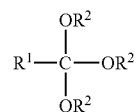

(5)

wherein $R^1$ is a hydrogen atom or $—CH_3$, and $R_2$ are $—CH_3$, $—C_2H_5$ which may be the same or different.

The dehydrating agents may be used in a single kind or in a combination of two or more kinds.

As the organic alkoxy compound represented by the formula (5), there can be particularly preferably used a methyl orthoformate and/or a methyl orthoacetate since they easily volatilize through the heating and drying.

[Preparation of the Composition for Forming Gas-Barrier Material]

It is desired that the composition for forming a gas-barrier material of the present invention contains the alicyclic epoxy compound (B) in an amount of 0.1 to 20 parts by weight and, particularly, 0.2 to 10 parts by weight per 100 parts by weight of the polycarboxylic acid-type polymer (A).

When the compound (C) is to be blended in addition to the polycarboxylic acid-type polymer (A) and the alicyclic epoxy compound (B), further, it is desired that the compound (B) is contained in an amount of 0.01 to 20 parts by weight and, particularly, 0.02 to 5 parts by weight and the compound (C) is contained in an amount of 0.01 to 60 parts by weight and, particularly, 0.1 to 20 parts by weight per 100 parts by weight of the polycarboxylic acid-type polymer (A).

The preparation method by using the components (A) and (B) necessitates a solvent other than water, in which the polycarboxylic acid-type polymer (A) is soluble. Preferably, a solution of the polycarboxylic acid-type polymer is prepared by using an alcohol such as methanol, ethanol or isopropanol or by using a mixed solvent containing the alcohol. If the alicyclic epoxy compound (B) and the compound (C), too, are soluble in the above solvent composition, then they may be directly added thereto. Or, the alicyclic epoxy compound (B) and the compound (C) may be dissolved in a separate solvent which is capable of maintaining their dissolved state after adding to the solution of the polycarboxylic acid-type polymer, and which may then be added to the solution of the polycarboxylic acid-type polymer.

Though dependent upon the kinds of the compound (B) and the compound (C) that are used, the composition for forming a gas-barrier material can be prepared by using a mixed solvent containing water such as of water/alcohol. When the compound (C) is to be blended, however, it is desired that the dehydrating agent (D) is blended to prevent the compound (C) from being deactivated as described above. It is, therefore, desired that the solvent used for the preparation of the composition for forming a gas-barrier material comprises chiefly a solvent other than water. Namely, it is desired to use a solvent that can be volatilized requiring less heat than water, i.e., to use an alcohol or a mixed solvent containing an alcohol to prepare a solution of the polycarboxylic acid-type polymer (A). Then the compounds (C), (B) and (D) may be directly added to the above solvent composition if they are soluble therein.

Further, the compounds (C), (B) and (D) may be dissolved in a separate solvent which is capable of maintaining their dissolved state after adding to the solution of the polycarboxylic acid-type polymer (A), and which may then be added to the solution of the polycarboxylic acid-type polymer. Or, a solution containing the compounds (C) and (B) may be added, first, to the solution of the polycarboxylic acid-type polymer (A) which may, thereafter, be blended with the compound (D).

Though dependent upon the kind of the alicyclic epoxy compound, the solvent that can be preferably used is an alcohol such as methanol, ethanol or isopropanol, a ketone such as 2-butanone or acetone, an aromatic solvent such as toluene, or a mixed solvent thereof. The alicyclic epoxy compound is dissolved in the above solvent which is then added to an alcohol solution of the polycarboxylic acid-type polymer.

In preparing the composition for forming a gas-barrier material of the invention, further, an acidic or basic catalyst may be added to accelerate the reaction of the carboxyl group of the polycarboxylic acid-type polymer (A) with the epoxy group of the alicyclic epoxy compound (B) and the reaction thereof with the ring structures (c) of the compound (C).

As the acid catalyst, there can be exemplified monovalent acids such as acetic acid, propionic acid, ascorbic acid, benzoic acid, hydrochloric acid, paratoluenesulfonic acid, and alkylbenzenesulfonic acid, and divalent or more highly valent acids such as sulfuric acid, sulfurous acid, phosphoric acid, phosphorous acid, hypophosphorous acid, polyphosphoric acid, pyrophosphoric acid, maleic acid, itaconic acid, fumaric acid and polycarboxylic acid.

As the basic catalyst, there can be exemplified hydroxides of alkali metals or alkaline earth metals, such as sodium hydroxide, potassium hydroxide, lithium hydroxide, calcium hydroxide and barium hydroxide; ammonia; primary monoamines such as ethylamine, propylamine, butylamine, benzylamine, monoethanolamine, neopentanolamine, 2-aminopropanol and 3-aminopropanol; secondary monoamines such as diethylaminodiethanolamine, di-n- or di-iso-propanolamine, N-methylethanolamine and N-ethylethanolamine; tertiary monoamines such as dimethylethanolamine, trimethylamine, triethylamine, triisopropylamine, methyldiethanolamine and dimethylaminoethanol; and polyaminetriethylamines such as diethylenetriamine, hydroxyethylaminoethylamine, ethylaminoethylamine and methylaminopropylamine.

In addition to the above components, the composition for forming the gas-barrier material of the present invention may further contain an inorganic dispersant. The inorganic dispersant has a function for protecting the gas-barrier material by blocking the water component from the exterior and, further, improves gas-barrier property and water resistance.

The inorganic dispersant may be of any shape such as spherical shape, needle-like shape or lamellar shape, but should be wettable with the polycarboxylic acid polymer (A), alicyclic epoxy compound (B) and, further, with compound (C), and should be dispersed well in the composition for forming the gas-barrier material. From the standpoint of blocking the water component, in particular, there is preferably used a silicate compound having a lamellar crystal structure, such as water-swelling mica and clay. It is desired that the inorganic dispersant has an aspect ratio of not smaller than 30 but not larger than 5000 from the standpoint of being dispersed like a layer to block the water component.

It is desired that the inorganic dispersant is contained in an amount of 5 to 100 parts by weight per 100 parts by weight of the total of the polycarboxylic acid polymer (A), alicyclic epoxy compound (B) and compound (C).

(Gas-Barrier Material)

The gas-barrier material of the present invention can be formed by heating the above-mentioned composition for forming a gas-barrier material at a temperature of 60 to 140° C. for 1 second to 5 minutes though the condition may vary depending on the kinds of the polycarboxylic acid-type polymer (A), the alicyclic epoxy compound (B), and compound (C) that are used and upon the amount of applying the composition for forming a gas-barrier material.

The gas-barrier material of the present invention can be obtained by either forming the composition for forming a gas-barrier material into a sheet or a film followed by the heating to thereby obtain the gas-barrier material of a crosslinked structure or by applying the composition for forming a gas-barrier material onto a base material followed by the heating to thereby form a crosslinked structure, and removing the composition from the base material to obtain the gas-barrier material of a single layer. Moreover, the gas-barrier layer may be formed on a plastic base material to obtain a multi-layered gas-barrier material.

The gas-barrier material forming the crosslinked structure further contains unreacted carboxyl groups that were not used for forming the crosslinked structure. In the present invention, therefore, it is particularly preferred to form metal ionic crosslinks among the unreacted carboxyl groups that are remaining. This decreases the unreacted carboxyl groups, very improves the water resistance and, further, introduces the ionically crosslinked structure into the crosslinked structure of the polycarboxylic acid-type polymer. Therefore, more densely crosslinked structure is imparted making it possible to greatly improve the gas-barrier property particularly under highly humid conditions.

It is desired that the metal ionic crosslinks are formed by metal ionically crosslinking the carboxyl groups in the gas-barrier material in an amount corresponding to at least an acid value of not less than 100 mg/g KOH and, more preferably, not less than 330 mg/g KOH in the gas-barrier material.

The metal ionic crosslinks can be easily formed among the unreacted carboxyl groups remaining in the gas-barrier material that is forming the crosslinked structure by treating the gas-barrier material with water containing a polyvalent metal compound.

As the treatment with water containing a polyvalent metal compound, there can be conducted (i) a treatment for dipping the gas-barrier material in water that contains the polyvalent metal compound, (ii) a treatment for spraying water containing the polyvalent metal compound onto the gas-barrier material, (iii) a treatment for placing the gas-barrier material in a highly humid atmosphere after the treatment of (i) or (ii) above, or (iv) a retort treatment with water containing the polyvalent metal compound (or, preferably, a method which brings hot water into direct contact with a packing material).

The treatment (iii) is for bringing about the aging effect after the treatment (i) or (ii), and shortens the time required by the treatment (i) or (ii). In any one of the above treatments (i) to (iii), water used for the treatment may be cold water. From such a standpoint that water containing the polyvalent metal compound easily acts on the gas-barrier material, however, the temperature of water containing the polyvalent metal compound is set to be not lower than 20° C. and, particularly, 40 to 100° C. In the case of (i) or (ii), it is desired that the treating time is not shorter than 1 second and, particularly 3 seconds to 4 days. In the case of (iii), it is desired that the treatment of (i) or (ii) is conducted for not shorter than 0.5 seconds and, particularly, 1 second to 1 hour and, thereafter, the treatment for placing the gas-barrier material in a highly humid atmosphere is conducted for not shorter than 1 hour and, particularly, about 2 hours to about 14 days. In the case of the above treatment (iv), the treating temperature is not lower than 101° C. and, particularly, 120 to 140° C., and treatment is conducted for not shorter than 1 second and, particularly, about 3 seconds to about 120 minutes.

Further, the gas-barrier material formed by using a coating solution in which the polyvalent metal compound has been dissolved or dispersed in advance may similarly be treated with water or water that contains the polyvalent metal compound.

There is no particular limitation on the polyvalent metal ions provided they are capable of crosslinking the carboxyl groups possessed by the resin. It is desired that the polyvalent metal ions have a valency of not less than 2 and, particularly, 2 to 3. Preferably, there can be used divalent metal ions such as magnesium ions $Mg^{2+}$ and calcium ions $Ca^{2+}$.

As the metal ions, there can be exemplified those metal ions of alkaline earth metals (magnesium Mg, calcium Ca, strontium Sr, barium Ba, etc.), metals of the Group 8 of periodic table (iron Fe, ruthenium Ru, etc.), metals of the Group 11 of periodic table (copper Cu, etc.), metals of the Group 12 of periodic table (zinc Zn, etc.), and metals of the Group 13 of periodic table (aluminum Al, etc.). Among them, as the divalent metal ions, there can be exemplified magnesium ions $Mg^{2+}$, calcium ions $Ca^{2+}$, strontium ions $Sr^{2+}$, barium ions $Ba^{2+}$, copper ions $Cu^{2+}$ and zinc ions $Zn^{2+}$. As the trivalent metal ions, there can be exemplified aluminum ions $Al^{3+}$ and iron ions $Fe^{3+}$. The above metal ions can be used in a single kind or in two or more kinds in combination. As the water-dissociable metal compound which is a source of the above polyvalent metal ions, there can be exemplified salts of metals constituting the metal ions, such as halides (e.g., chlorides like magnesium chloride, calcium chloride, etc.), hydroxides (e.g., magnesium hydroxide, calcium hydroxide, etc.), oxides (e.g., magnesium oxide, calcium oxide, etc.), carbonates (e.g., magnesium carbonate, calcium carbonate), inorganic acid salts such as perhalogenates (e.g., perchlorates like magnesium perchlorate, calcium perchlorate, etc.), sulfates, sulfites (e.g., magnesium sulfonate, calcium sulfonate, etc.), nitrates (e.g., magnesium nitrate, calcium nitrate, etc.), hypophosphites, phosphites, phosphates (e.g., magnesium phosphate, calcium phosphate, etc.), organic acid salts such as carboxylates (e.g., acetates like magnesium acetate, calcium acetate, etc.).

These metal compounds can be used in a single kind or in a combination of two or more kinds. Among these compounds, it is desired to use halides and hydroxides of the above metals.

It is desired that the polyvalent metal compounds are contained in water in amounts of not less than 0.125 mmol/L, more preferably, not less than 0.5 mmol/L and, further desirably, not less than 2.5 mmol/L calculated as metal atoms.

In any treatment, it is desired that water containing the polyvalent metal compound is neutral to alkaline from such a standpoint that the unreacted carboxyl groups that were not used for forming the crosslinked structure in the gas-barrier material are dissociated by the infiltration of water contributing to easily forming metal ionic crosslinks.

The gas-barrier material of the present invention has gas-barrier performance enough for a retort packing material exhibiting such excellent gas-barrier property and retort resistance that the amount of oxygen permeation before the retorting is not larger than $cm^3/m^2 \cdot day \cdot atm$ (in an environment of 25° C.-80% RH) (in compliance with JIS K 7126-1) and that the amount of oxygen permeation after the retorting is not larger than 10 $cm^3/m^2 \cdot day \cdot atm$ (in an environment of 25° C.-80% RH) and, preferably, not larger than 5 $cm^3/m^2 \cdot day \cdot atm$ (in an environment of 25° C.-80% RH).

(Packing Material)

A packing material of the present invention has the gas-barrier material formed on the surface of the plastic base material or formed between the plastic layers.

As the plastic base material, there can be exemplified any packing materials such as films, sheets, bottles, cups, trays and cans made from thermoplastic resins that can be heat-formed through such means as extrusion forming, injection forming, blow forming, draw-blow forming or press forming.

Suitable examples of the resin constituting the plastic base material may include olefinic copolymers such as low-, intermediate- or high-density polyethylene, linear low-density polyethylene, polypropylene, ethylene/propylene copolymer, ethylene/butene copolymer, ionomer, ethylene/vinyl acetate copolymer and ethylene/vinyl alcohol copolymer; polyesters such as polyethylene terephthalate, polybutylene terephthalate, polyethylene terephthalate/isophthalate and polyethylene naphthalate; polyamides such as nylon 6, nylon 6,6, nylon 6,10 and methaxyleneadipamide; styrene copolymers such as polystyrene, stylene/butadiene block copolymer, styrene/acrylonitrile copolymer and styrene/butadiene/acrylonitrile copolymer (ABS resin); vinyl chloride-type copolymers such as polyvinyl chloride, vinyl chloride/vinyl acetate copolymer; acrylic copolymers such as polymethyl methacrylate and methyl methacrylate/ethyl acrylate copolymer; and polycarbonates.

These thermoplastic resins may be used in a single kind or may be made present as a blend of two or more kinds. The plastic base material may be constituted as a single layer or as a laminate of two or more layers formed by simultaneous melt extrusion or by any other lamination method.

To the above thermoplastic resin that can be melt-formed, it is allowable, as a matter of course, to add, as required, one or two or more of additives such as pigment, antioxidant, antistatic agent, ultraviolet-ray absorbing agent and lubricant in a total amount in a range of 0.001 part to 5.0 parts per 100 parts by weight of the resin.

Further, the container can be reinforced by, for example, being blended with one or two or more kinds of fibrous reinforcing material such as glass fiber, aromatic polyamide fiber, carbon fiber, pulp or cotton linter; a powdery reinforcing material such as carbon black or white carbon; or flaked reinforcing material such as glass flakes or aluminum flakes in a total amount of 2 to 150 parts by weight per 100 parts by weight of the thermoplastic resin and may, further, be blended with one or two or more kinds of fillers such as heavy or soft calcium carbonate, mica, talc, kaolin, clay, barium sulfate, alumina powder, silica powder and magnesium carbonate in a total amount of 5 to 100 parts by weight per 100 parts by weight of the thermoplastic resin according to a known recipe.

In order to improve the gas-barrier property, further, the container may be blended with a scale-like inorganic fine powder such as water-swelling mica or clay in a total amount of 5 to 100 parts by weight per 100 parts by weight of the thermoplastic resin according to a known recipe.

According to the present invention, the above gas-barrier material can be formed on the surfaces of the final film, sheet or container, or a preform for forming the container may be coated with the gas-barrier material. As the preform, there can be exemplified a cylindrical parison with or without bottom for biaxial draw-blow forming, a pipe for forming a plastic can, a sheet for vacuum forming, compressed-air forming or plug-assisted forming, a heat-sealable lid and a film for forming bags.

In the packing material of the present invention, it is desired that the gas-barrier material usually has a thickness of 0.1 to 10 μm and, particularly, 0.5 to 5 μm. If the thickness is smaller than the above range, the oxygen barrier property may often become insufficient. Even if the thickness is greater than the above range, on the other hand, no distinguished effect is obtained but rather the packing material becomes expensive, which is disadvantageous. The gas-barrier material may be provided as a single layer on the inner surface of the container, on the outer surface of the container or as an intermediate layer of a laminate, or may be formed in the form of a plurality of layers on the inner and outer surfaces of the container, or on at least either the inner surface or the outer surface of the container and as a intermediate layer of the laminate.

The final container can be formed from the coated preform by the biaxial draw-blow forming or plug-assisted forming under known conditions. Further, a film or a sheet coated with a layer thereof may be stuck to another film or sheet to form a laminate which may then be used as a heat-sealable lid, pouch or a preform for forming container.

When the gas-barrier material of the invention is used as a packing material, it is desired that at least one surface of the layer of the gas-barrier material is provided with an anchor layer to further improve the closely adhering property between the layers making it possible to further improve the mechanical strength of the container and the flexibility of the laminate. When the layer of the gas-barrier material is formed on the inner and outer surfaces of the container or as the outermost layer of the laminate, the layer of the gas-barrier material may be formed via the anchor layer. When the layer of the gas-barrier material is used as the intermediate layer of the laminate, the anchor layer may be formed on at least one surface of the layer of the gas-barrier material.

In the packing material of the invention, the anchor material can be formed by using polymers of various kinds such as urethane, epoxy, acrylic and polyester. It is particularly desired that the anchor material contains an urethane-type polymer.

Further, the anchor material may be constituted by using a principal agent and a curing agent, and may either be a precursor for which the curing reaction has not been completed or assume a state where the curing agent is present in an excess amount. In the case of the urethane type, for example, the anchor material is chiefly constituted by a polyol component such as polyesterpolyol or polyetherpolyol and a polyisocyanate component, the polyisocyanate component being so present that the number of the isocyanate groups in the polyisocyanate component is greater than the number of hydroxyl groups in the polyol component.

As the polyol component used for forming the urethane-type polymer, it is desired to use a polyesterpolyol. As the polyesterpolyol, there can be exemplified a polyesterpolyol obtained by reacting a polyvalent carboxylic acid, a dialkylester thereof or a mixture thereof with glycols or a mixture thereof.

As the polyvalent carboxylic acid, there can be exemplified aromatic polyvalent carboxylic acids such as isophthalic acid, terephthalic acid, naphthalenedicarboxylic acid, and aliphatic polyvalent carboxylic acids such as adipic acid, azelaic acid, sebacic acid and cyclohexanedicarboxylic acid.

As the glycol, there can be exemplified ethylene glycol, propylene glycol, diethylene glycol, butylene glycol, neopentyl glycol and 1,6-hexanediol.

The glass transition temperature of the polyesterpolyol is, preferably, −50° C. to 100° C. and, more preferably, −20° C. to 80° C. Further, the number average molecular weight of the polyesterpolyol is, preferably, 1,000 to 100,000 and, more preferably, 3,000 to 80,000.

As the polyisocyanate used for forming the urethane-type polymer, there can be exemplified aromatic polyisocyanates such as 2,4-tolylenediisocyanate, 2,6-tolylenediisocyanate, m-phenylenediisocyanate, p-phenylenediisocyanate, 4,4'-diphenylmethanediisocyanate, 2,4'-diphenylmethanediisocyanate, 2,2'-diphenylmethanediisocyanate, 3,3'-dimethyl-4,4'-biphenylenediisocyanate, 3,3'-dimethoxy-4,4'-biphenylenediisocyanate, 3,3'-dichloro-4,4'-biphenylenediisocyanate, 1,5-naphthalenediisocyanate, 1,5-tetrahydronaphthalenediisocyanate, xylylenediisocyanate and tetramethylxylylenediisocyanate; aliphatic polyisocyanates such as tetramethylenediisocyanate, 1,6-hexamethylenediisocyanate, dodecamethylenediisocyanate, trimethylhexamethylenediisocyanate, 1,3-cyclohexylenediisocyanate, 4-cyclohexylenediisocyanate, hydrogenated xylylenediisocyanate, lysinediisocyanate, isophoronediisocyanate, 4,4'-dicyclohexylmethanediisocyanate and 3,3'-dimethyl-4,4'-dicyclohexylmethanediisocyanate; polyfunctional polyisocyanate compounds derived from the polyisocyanate monomers, such as isocyanurate, biuret and allophanate; and polyfunctional polyisocyanate compounds containing a terminal isocyanate group obtained by the reaction with a trifunctional or more highly functional polyol compound, such as trimethylolpropane or glycerine.

In the packing material of the present invention, though not limited thereto only, the anchor layer is obtained by heating a coating material composition containing the polyisocyanate in an amount of 1 to 100 parts by weight and, particularly, 5 to 80 parts by weight per 100 parts by weight of the polyesterpolyol, at a temperature of 60 to 170° C. for 2 seconds to 5 minutes depending upon the kind of the polyesterpolyol or polyisocyanate that is used and upon the amount of applying the coating material composition.

The coating material composition can be prepared by dissolving the polyesterpolyol and the polyisocyanate in a solvent such as toluene, MEK, cyclohexanone, Sorbesso, isophorone, xylene, ethyl acetate or butyl acetate or in a mixed solution thereof, or by mixing the solutions thereof. In addition to the above components, there can be further used known cure accelerator catalyst, filler, softening agent, anti-aging agent, stabilizer, adhesion promoting agent, leveling agent, defoaming agent, plasticizer, inorganic filler, stickiness-imparting resin, fibers, coloring agent such as pigment and usable time extender.

The thickness of the anchoring layer is, preferably, 0.01 to 10 µm, more preferably, 0.05 to 5 µm and, further preferably, 0.1 to 3 µm. If the thickness is smaller than the above range, the anchor layer may not often exhibit the effect for improving closely adhering property. Even if the thickness is greater than the above range, on the other hand, no distinguished effect is obtained but rather the packing material becomes expensive, which is disadvantageous.

The packing material of the present invention is provided with the anchor layer to improve the closely adhering property between the layers. This further improves flexibility of the laminate while suppressing an increase in the amount of oxygen permeation after the laminate is bent repetitively.

EXAMPLES

The invention will now be described by way of Examples but it should be noted that the invention is in no way limited to the following Examples only.
(Extractability with Methanol)

In Examples 1 to 14 and Comparative Examples 1 to 4, extractabilities with methanol were found according to the following procedure.

A test plate was measured for its weight. - - - (1)

The coating material was so applied to the test plate that the thickness of film was 2 µm when dried. After treated with heat at a temperature of 140° C. for 2 minutes, the test plate was measured for its weight. - - - (2)

The test plate was dipped in 1000 ml of methanol and was extracted under heated and refluxing conditions for 60 minutes. Then, the test plate was dried and measured for its weight. - - - (3).

Weight reduction (%) of the coating before and after dipped in methanol was measured in compliance with the following formula, $$\text{Extractability with methanol (\%)} = [(2)-(3)/(2)-(1)] \times 100$$

In Examples 15 to 25 and Comparative Examples 5 and 6, extractabilities with methanol were found according to the following procedure.

The test plate was measured for its weight. - - - (1)

The coating material was so applied to the test plate that the thickness of film was 2 µm when dried. After treated with heat at a temperature of 100° C. for 8 seconds or at a temperature of 140° C. for 20 second, the test plate was measured for its weight. - - -(2)

The test plate was dipped in 1000 ml of methanol and was extracted under heated and refluxing conditions for 60 minutes. Then, the test plate was dried and measured for its weight. - - -(3).

Weight reduction (%) of the coating before and after dipped in methanol was measured in compliance with the following formula, $$\text{Extractability with methanol (\%)} = [(2)-(3)/(2)-(1)] \times 100$$

(Amount of Oxygen Permeation)

The amount of oxygen permeated through the laminate of the obtained plastic film was measured by using an apparatus for measuring the amount of oxygen permeation (OX-TRAN 2/20 manufactured by Modern Control Co.). The amount of oxygen permeation after the retort sterilization at 120° C. for 30 minutes was also measured. The measuring conditions consisted of an environmental temperature of 25° C. and a relative humidity of 80%.

Example 1

A polyesterpolyol (Byron 200 manufactured by Toyo Boseki Co.) was dissolved in an ethyl acetate/MEK mixed solvent (weight ratio of 60/40) in a manner that the weight thereof was 20% by weight. Into the above solution were added a polyisocyanate (Sumijule N3300 manufactured by Sumika-Bayer Urethane Co.) and a di-n-butyltin dilaurate (manufactured by Wako Junyaku Co.) in a manner that the amounts thereof were 60% by weight and 0.5% by weight with respect to the polyesterpolyol, and the solution was diluted with the above mixed solvent so that the whole solid content was 14% by weight to thereby prepare a coating solution for forming an anchor layer.

The coating solution was applied by using a bar coater onto a biaxially drawn polyethylene terephthalate film 2 of a thickness of 12 µm, and was heat-treated by using a box-type electric oven under the conditions of a preset temperature of 70° C. for 2 minutes to obtain a polyethylene terephthalate film having an anchor layer 3 of a thickness of 0.3 µm.

A polyacrylic acid (AC-10LHP manufactured by Nihon Junyaku Co.) was added as the polycarboxylic acid-type polymer (A) to a methanol solvent and was dissolved therein so that the solid content thereof was 12% by weight to prepare a solution (I). A 3,4-epoxycyclohexylmethyl-(3,4-epoxy)cyclohexane carboxylate (Cylacure UVR-6110 manufactured by Dow Chemical Co.) was dissolved as the alicyclic epoxy compound (B) in methanol so that the amount thereof was 1% by weight to prepare a solution (II). The solution (II) was added to the solution (I) in a manner that the amount of the 3,4-epoxycyclohexylmethyl(3,4-epoxy)cyclohexane carboxylate was 1% by weight with respect to the polyacrylic acid, and the mixture thereof was diluted with methanol so that the whole solid content (solid contents of polyacrylic acid and 3,4-epoxycyclohexylmethyl(3,4-epoxy)cyclohexane carboxylate) was 8% by weight to prepare a coating solution for forming a barrier layer.

The above coating solution was applied by using a bar coater onto the anchor layer of the above polyethylene terephthalate film having the anchor layer 3. The above film after applied was heat-treated by using the box-type electric oven under the conditions of a preset temperature of 140° C. for 2 minutes to obtain a polyethylene terephthalate film having a barrier layer 4 of a thickness of 2 µm on the anchor layer 3. Calcium chloride was added in an amount of 3.75 mmols (4.2 g) calculated as metal to 1 liter of city water heated at 50° C., and the above film was dipped therein for 17 hours. After taken out from the hot water and dried, the coating of the film was faced downward, and on which were successively laminated an urethane-type adhesive 5 of a thickness of 2 µm, a biaxially drawn nylon film 6 of a thickness of 15 µm, an urethane-type adhesive 7 of a thickness of 2 μm and an undrawn polypropylene film 8 of a thickness of 70 μm to obtain a laminate 1 of a layer constitution as shown in FIG. 1.

Example 2

A polyethylene terephthalate film having an anchor layer was obtained in the same manner as in Example 1 but effecting the heat treatment by using a conveyer-type electric oven under the conditions of a temperature of 120° C. and a passing time of 20 seconds.

Further, a polyethylene terephthalate film having an anchor layer and a barrier layer was obtained in the same manner as in Example 1 but using a mixed solvent of 2-propanol/2-butanone=50/50 (weight ratio) as a solvent for the coating solution for forming a barrier layer and effecting the heat treatment by using the conveyer-type electric oven under the conditions of a preset temperature of 140° C. and a passing time of 20 seconds.

Further, a laminate was obtained by the same method as that of Example 1 but adding calcium chloride in an amount of 360 mmols (40 g) calculated as metal to 1 liter of city water, adding calcium hydroxide in an amount of 11 g per liter of city water to adjust the pH of the dipping water to 12.0 (value at a water temperature of 24° C.) and, thereafter, dipping the polyethylene terephthalate film in water heated at 40° C. with stirring for 3 seconds.

Example 3

A polyethylene terephthalate film having an anchor layer and a barrier layer was obtained in the same manner as in Example 1 but heat-treating the polyacrylic acid by using the box-type electric oven at a temperature of 170° C. for 10 minutes, immediately adding it into a methanol solvent and dissolving it therein so that the solid content thereof was 12% to prepare a solution (III), adding the solution (II) to the solution (III) so that the amount of the 3,4-epoxycyclohexylmethyl (3,4-epoxy) cyclohexane carboxylate was 0.5% by weight with respect to the polyacrylic acid, diluting the mixture thereof with methanol so that the whole solid content was 8% by weight to prepare a coating solution for forming a barrier layer, and effecting the heat treatment after the barrier layer is applied at a preset temperature of 120° C. Thereafter, a laminate was obtained by the same method as that of Example 2.

Example 4

A laminate was obtained by the same method as that of Example 1 but using a mixed solvent of 2-propanol/2-butanone=50/50 (weight ratio) as the solvent for a coating solution for forming a barrier layer, and adding the 3,4-epoxycyclohexylmethyl(3,4-epoxy)cyclohexane carboxylate in an amount of 0.1% by weight with respect to the polyacrylic acid.

Example 5

A laminate was obtained by the same method as that of Example 1 but using a mixed solvent of 2-propanol/2-butanone=50/50 (weight ratio) as the solvent for a coating solution for forming a barrier layer, adding the 3,4-epoxycyclohexylmethyl(3,4-epoxy)cyclohexane carboxylate in an amount of 20% by weight with respect to the polyacrylic acid, and heat-treating the film with the barrier coating by using the conveyer-type electric oven under the conditions of a preset temperature of 120° C. and a passing time of 10 seconds.

Example 6

A laminate was obtained by the same method as that of Example 1 but using a bis(3,4-epoxycyclohexylmethyl) adipate (Cylacure UVR-6128 manufactured by Dow Chemical Co.) as the alicyclic epoxy compound (B).

Example 7

A laminate was obtained by the same method as that of Example 1 but using a 1,2:8,9-diepoxylimonene (Celoxide 3000 manufactured by Daicel Kagaku Kogyo Co.) as the alicyclic epoxy compound (B) and adding it in an amount of 2% by weight with respect to the polyacrylic acid.

Example 8

A laminate was obtained by the same method as that of Example 1 but using a polyfunctional alicyclic epoxy resin (Epolead GT-301 produced by Daicel Kagaku Kogyo Co.) of the following formula as the alicyclic epoxy compound (B) and adding it in an amount of 0.5% by weight with respect to the polyacrylic acid.

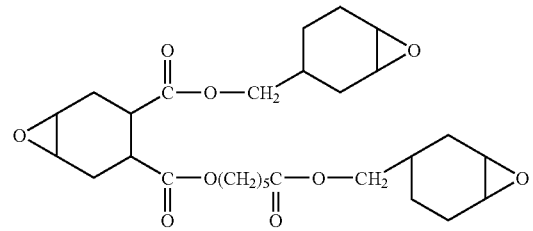

Example 9

A laminate was obtained by the same method as that of Example 1 but using a bis(2,3-epoxycyclopentyl)ether (CAS No. 2386-9-5) as the alicyclic epoxy compound (B).

Example 10

A laminate was obtained by the same method as that of Example 1 but using a polymethacrylic acid (molecular weight of 100,000 manufactured by Wako Junyaku Co.) as the polycarboxylic acid-type polymer.

Example 11

A laminate was obtained by the same method as that of Example 1 but using a mixed solvent of methanol/water=80/20 (weight ratio) as the solvent for the coating solution for forming a barrier layer while adding thereto an aqueous solution of sodium hydroxide adjusted to 0.5 N so as to neutralize the carboxyl groups of polyacrylic acid by 5 mol %.

Example 12

A laminate was obtained by the same method as that of Example 1 but adding the 3,4-epoxycyclohexylmethyl-3,4-epoxycyclohexane carboxylate in an amount of 20% by weight with respect to the polyacrylic acid without dipping the polyethylene terephthalate film after the anchor layer and barrier layer had been formed thereon.

Example 13

Figure 2:
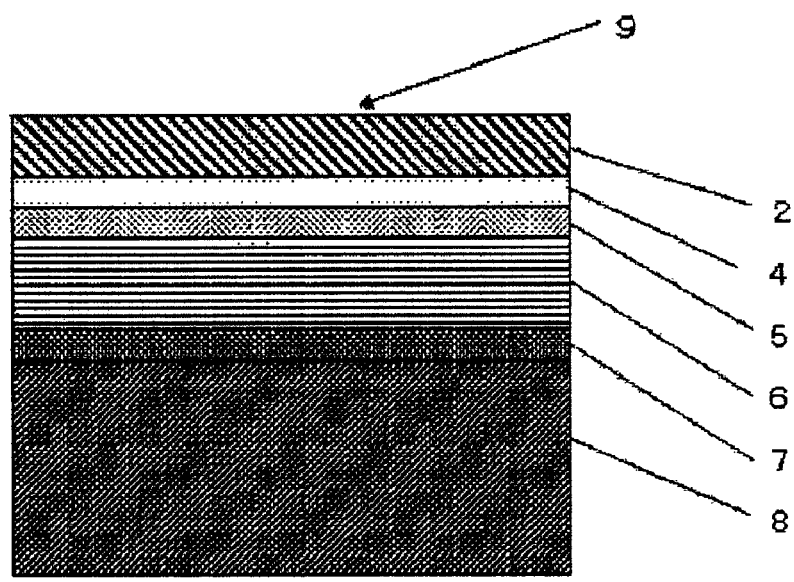
FIG. 2 is a view of the sectional structure of a laminate produced in Examples 13 and 24.

A laminate 9 shown in FIG. 2 was obtained by the same method as that of Example 2 but forming a barrier layer 4 directly on the biaxially drawn polyethylene terephthalate film 2 of a thickness of 12 μm without forming the anchor layer.

Example 14

Figure 3:
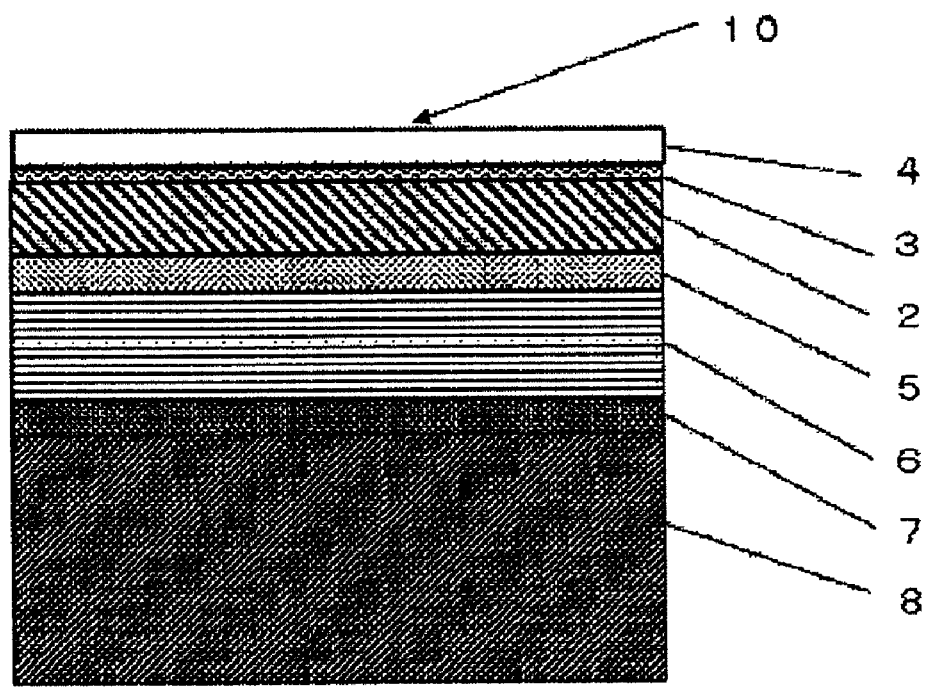
FIG. 3 is a view of the sectional structure of a laminate produced in Examples 14 and 25.

A laminate 10 shown in FIG. 3 was obtained by the same method as that of Example 2 but with a barrier layer 4 as the surface layer, and successively laminating thereon an urethane-type adhesive agent 5 of a thickness of 2 μm, a biaxially drawn nylon film 6 of a thickness of 15 μm, an urethane-type adhesive 7 of a thickness of 2 μm and an undrawn polypropylene film 8 of a thickness of 70 μm.

Comparative Example 1

A laminate was obtained by the same method as that of Example 1 but using an ethylene glycol diglycidyl ether (produced by Kishida Kagaku Co.) instead of using the alicyclic epoxy compound (B).

Comparative Example 2

A laminate was obtained by the same method as that of Comparative Example 1 but adding the ethylene glycol diglycidyl ether in an amount of 10% by weight with respect to the polyacrylic acid.

Comparative Example 3

A laminate was obtained by the same method as that of Comparative Example 2 but using a bis(3-ethyl-3-oxetanylmethyl)ether (Aronoxetane OXT-221 manufactured by Toa Gosei Co.) instead of using the ethylene glycol diglycidyl ether.

Comparative Example 4

A laminate was obtained by the same method as that of Comparative Example 2 but using a 2,2-bis(4-hydroxyphenyl)propane [bisphenol A] instead of using the ethylene glycol diglycidyl ether.

Table 1 shows the material constitutions of Examples 1 to 14 and Comparative Examples 1 to 4, and Table 2 shows the measured results of the amounts of oxygen permeation before and after the retort-treatment of the laminates obtained in Examples 1 to 14 and in Comparative Examples 1 to 4. Examples 1 to 14 all demonstrate good barrier properties before and after the retort treatment.

TABLE 1

| | Anchor layer | Polycarboxylic acid polymer (A) Kind of polymer | Partly neutralized | Alicyclic epoxy compound (B) Kind of compound | Added amount (wt %) |
|---|---|---|---|---|---|
| Ex. 1 | yes | polyacrylic acid | no | 3,4-epoxycyclohexylmethyl(3,4-epoxy)cyclohexane carboxylate | 1 |
| Ex. 2 | yes | polyacrylic acid | no | 3,4-epoxycyclohexylmethyl(3,4-epoxy)cyclohexane carboxylate | 1 |
| Ex. 3 | yes | polyacrylic acid | no | 3,4-epoxycyclohexylmethyl(3,4-epoxy)cyclohexane carboxylate | 0.5 |
| Ex. 4 | yes | polyacrylic acid | no | 3,4-epoxycyclohexylmethyl(3,4-epoxy)cyclohexane carboxylate | 0.1 |
| Ex. 5 | yes | polyacrylic acid | no | 3,4-epoxycyclohexylmethyl(3,4-epoxy)cyclohexane carboxylate | 20 |
| Ex. 6 | yes | polyacrylic acid | no | bis(3,4-epoxycyclohexylmethyl) adipate | 1 |
| Ex. 7 | yes | polyacrylic acid | no | 1,2:8,9-diepoxylimonene | 2 |
| Ex. 8 | yes | polyacrylic acid | no | polyfunctional alicyclic epoxy resin | 0.5 |
| Ex. 9 | yes | polyacrylic acid | no | bis(2,3-epoxycyclopentyl)ether (CAS No. 2388-9-5) | 1 |
| Ex. 10 | yes | polymethacrylic acid | no | 3,4-epoxycyclohexylmethyl(3,4-epoxy)cyclohexane carboxylate | 1 |
| Ex. 11 | yes | polyacrylic acid | yes | 3,4-epoxycyclohexylmethyl(3,4-epoxy)cyclohexane carboxylate | 1 |
| Ex. 12 | yes | polyacrylic acid | no | 3,4-epoxycyclohexylmethyl(3,4-epoxy)cyclohexane carboxylate | 20 |
| Ex. 13 | no | polyacrylic acid | no | 3,4-epoxycyclohexylmethyl(3,4-epoxy)cyclohexane carboxylate | 1 |
| Ex. 14 | yes | polyacrylic acid | no | 3,4-epoxycyclohexylmethyl(3,4-epoxy)cyclohexane carboxylate | 1 |
| Comp. Ex. 1 | yes | polyacrylic acid | no | ethylene glycol diglycidyl ether | 1 |
| Comp. Ex. 2 | yes | polyacrylic acid | no | ethylene glycol diglycidyl ether | 10 |
| Comp. Ex. 3 | yes | polyacrylic acid | no | bis(3-ethyl-3-oxetanylmethyl)ether | 10 |
| Comp. Ex. 4 | yes | polyacrylic acid | no | 2,2-bis(4-hydroxyphenyl)propane [bisphenol A] | 10 |
| Uncoated laminate | — | — | | — | — |

TABLE 1-continued

|  | Solvent constitution (weight ratio) | Heat treatment of barrier layer | |
|---|---|---|---|
|  |  | Kind of oven | Treating conditions |
| Ex. 1 | methanol | box | 140° C. 2 min. |
| Ex. 2 | IPA/MEK (50/50) | conveyer | 140° C. 20 sec. |
| Ex. 3 | methanol | box | 120° C. 2 min. |
| Ex. 4 | IPA/MEK (50/50) | box | 140° C. 2 min. |
| Ex. 5 | IPA/MEK (50/50) | conveyer | 120° C. 10 sec. |
| Ex. 6 | methanol | box | 140° C. 2 min. |
| Ex. 7 | methanol | box | 140° C. 2 min. |
| Ex. 8 | methanol | box | 140° C. 2 min. |
| Ex. 9 | methanol | box | 140° C. 2 min. |
| Ex. 10 | methanol | box | 140° C. 2 min. |
| Ex. 11 | methanol | box | 140° C. 2 min. |
| Ex. 12 | methanol | box | 140° C. 2 min. |
| Ex. 13 | IPA/MEK (50/50) | conveyer | 140° C. 20 sec. |
| Ex. 14 | IPA/MEK (50/50) | conveyer | 140° C. 20 sec. |
| Comp. Ex. 1 | methanol | box | 140° C. 2 min. |
| Comp. Ex. 2 | methanol | box | 140° C. 2 min. |
| Comp. Ex. 3 | methanol | box | 140° C. 2 min. |
| Comp. Ex. 4 | methanol | box | 140° C. 2 min. |
| Uncoated laminate | — | — | — |

IPA = 2-propanol,
MEK = 2-butanone

TABLE 2

|  | Extractability with methanol (%) | Dipping conditions for ionic crosslinking | | | |
|---|---|---|---|---|---|
|  |  | $Ca^{2+}$ concentration stemming from $CaCl_2$ (mmols/L) | pH of water (when water temp. is 24° C.) | Dipping temp. | Dipping time |
| Ex. 1 | <0.5 | 3.75 | 7.4 | 50° C. | 17 hrs. |
| Ex. 2 | <0.5 | 360 | 12.0 | 40° C. | 3 sec. |
| Ex. 3 | 1.2 | 360 | 12.0 | 40° C. | 3 sec. |
| Ex. 4 | 5.1 | 3.75 | 7.4 | 50° C. | 17 hrs. |
| Ex. 5 | <0.5 | 3.75 | 7.4 | 50° C. | 17 hrs. |
| Ex. 6 | 1.5 | 3.75 | 7.4 | 50° C. | 17 hrs. |
| Ex. 7 | 15.9 | 3.75 | 7.4 | 50° C. | 17 hrs. |
| Ex. 8 | 4.5 | 3.75 | 7.4 | 50° C. | 17 hrs. |
| Ex. 9 | <0.5 | 3.75 | 7.4 | 50° C. | 17 hrs. |
| Ex. 10 | 0.8 | 3.75 | 7.4 | 50° C. | 17 hrs. |
| Ex. 11 | 5.4 | 3.75 | 7.4 | 50° C. | 17 hrs. |
| Ex. 12 | <0.5 | — | — | — | — |
| Ex. 13 | <0.5 | 360 | 12.0 | 40° C. | 3 sec. |
| Ex. 14 | <0.5 | 360 | 12.0 | 40° C. | 3 sec. |
| Comp. Ex. 1 | 35.7 | 3.75 | 7.4 | 50° C. | 17 hrs. |
| Comp. Ex. 2 | 20.8 | 3.75 | 7.4 | 50° C. | 17 hrs. |
| Comp. Ex. 3 | 25.9 | 3.75 | 7.4 | 50° C. | 17 hrs. |
| Comp. Ex. 4 | 90.5 | 3.75 | 7.4 | 50° C. | 17 hrs. |
| Uncoated laminate | — | — | — | — | — |

|  | Position of barrier layer in the laminate | Amount of oxygen permeation ($cm^3/m^2 \cdot day \cdot atm$) | | Remarks |
|---|---|---|---|---|
|  |  | Before retorting | After retorting |  |
| Ex. 1 | lower layer | 0.05 | 0.15 |  |
| Ex. 2 | lower layer | 0.02 | 0.20 |  |

TABLE 2-continued

| | | | | |
|---|---|---|---|---|
| Ex. 3 | lower layer | 0.07 | 0.12 | |
| Ex. 4 | lower layer | 0.15 | 0.95 | |
| Ex. 5 | lower layer | 0.57 | 3.6 | |
| Ex. 6 | lower layer | 0.09 | 0.45 | |
| Ex. 7 | lower layer | 0.25 | 9.0 | |
| Ex. 8 | lower layer | 0.85 | 8.8 | |
| Ex. 9 | lower layer | 0.66 | 4.4 | |
| Ex. 10 | lower layer | 0.33 | 0.85 | |
| Ex. 11 | lower layer | 0.11 | 0.59 | |
| Ex. 12 | lower layer | 0.94 | 4.8 | |
| Ex. 13 | lower layer | 0.04 | 0.26 | |
| Ex. 14 | surface layer | 0.17 | 0.18 | |
| Comp. Ex. 1 | lower layer | 1.6 | 11 | |
| Comp. Ex. 2 | lower layer | 0.4 | 26 | |
| Comp. Ex. 3 | lower layer | 3.8 | 38 | Film partly dissolved during retorting |
| Comp. Ex. 4 | lower layer | — | — | Dissolved while being dipped |
| Uncoated laminate | lower layer | 70 | 130 | |

Example 15

A polyesterpolyol (Byron 200 manufactured by Toyo Boseki Co.) was dissolved in an ethyl acetate/MEK mixed solvent (weight ratio of 60/40) in a manner that the weight thereof was 20% by weight. Into the above solution were added a polyisocyanate (Sumijule N3300 manufactured by Sumika-Bayer Urethane Co.) and a di-n-butyltin dilaurate (manufactured by Wako Junyaku Co.) in a manner that the amounts thereof were 60% by weight and 0.5% by weight with respect to the polyesterpolyol, and the solution was diluted with the above mixed solvent so that the whole solid content was 14% by weight to thereby prepare a coating solution for forming an anchor layer.

The coating solution was applied by using a bar coater onto a biaxially drawn polyethylene terephthalate film 2 of a thickness of 12 μm, and was heat-treated by using a conveyer-type electric oven under the conditions of a preset temperature of 80° C. for 5 seconds to obtain a polyethylene terephthalate film having an anchor layer 3 of a thickness of 0.3 μm.

A polyacrylic acid (AC-10LHP manufactured by Nihon Junyaku Co.) was added as the polycarboxylic acid-type polymer (A) to a methanol/2-butanone mixed solvent (weight ratio of 50/50) and was dissolved therein so that the solid content thereof was 12% by weight to prepare a solution (I).

As the compound (C) which forms an ether bond with a carbon atom that is forming a double bond with a nitrogen atom and has two ring structures (c) including an oxygen atom in the ether bond, a 2,2'-bis(2-oxazoline) (manufactured by Tokyo Kasei Co.) was dissolved in methanol so that the solid content thereof was 10% by weight to prepare a solution (II).

As at least the biaxial alicyclic epoxy compound (B), the Cylacure UVR-6110 (3,4-epoxycyclohexylmethyl-(3,4-epoxy) cyclohexane carboxylate produced by Dow Chemical Co.) was dissolved in the methanol/2-butanone mixed solvent (weight ratio of 50/50) so that the solid content thereof was 10% by weight to prepare a solution (III).

The solution (I), solution (II) and solution (III) were mixed together so that the amount of the compound (C) was 5% by weight with respect to the polycarboxylic acid-type polymer (A) and that the amount of the compound (B) was 0.2% by weight with respect to the polycarboxylic acid-type polymer (A), and the mixture was diluted with the methanol/2-butanone mixed solvent (weight ratio of 50/50) so that the solid content was 8% by weight to thereby prepare a coating solution No. 1 for forming a barrier layer.

The above coating solution No. 1 was applied by using a bar coater onto the anchor layer of the above polyethylene terephthalate film having the anchor layer 3. The above film after applied was heat-treated by using the conveyer-type electric oven under the conditions of a preset temperature of 100° C. for 5 seconds or at 140° C. for 20 seconds to obtain a polyethylene terephthalate film having a barrier layer 4 of a thickness of 2 μm on the anchor layer 3.

Calcium chloride was added in an amount of 360 mmols (40 g) calculated as metal to 1 liter of city water and, thereafter, calcium hydroxide was added in an amount of 11 g to 1 liter of the city water to adjust the pH thereof to 12.0 (value at a water temperature of 24° C.). Water was heated at 40° C., and the above film was dipped therein for 3 seconds. After taken out from the hot water, the treating solution adhered on the surfaces was washed. After dried, the coating of the film was faced downward, and on which were successively laminated an urethane-type adhesive 5 of a thickness of 2 μm, a biaxially drawn nylon film 6 of a thickness of 15 μm, an urethane-type adhesive 7 of a thickness of 2 μm and an undrawn polypropylene film 8 of a thickness of 70 μm to obtain a laminate 1 of the layer constitution as shown in FIG. 1.

Example 16

A laminate was obtained by the same method as that of Example 15 but adding the 2,2'-bis(2-oxazoline) in an amount of 60% by weight and the 3,4-epoxycyclohexylmethyl(3,4-epoxy) cyclohexane carboxylate in an amount of 0.05% by weight with respect to the polyacrylic acid.

Example 17

A laminate was obtained by the same method as that of Example 15 but adding a methyl orthoformate (manufactured by Wako Junyaku Co.) as the dehydrating agent (D) to the coating solution for forming a barrier layer in an amount of 30% by weight with respect to the polyacrylic acid.

Example 18

A laminate was obtained by the same method as that of Example 15 but adding the 2,2'-bis(2-oxazoline) in an amount of 0.01% by weight and the 3,4-epoxycyclohexylmethyl(3,4-epoxy)cyclohexane carboxylate in an amount of 0.5% by weight with respect to the polyacrylic acid, and, further, adding the methyl orthoformate (manufactured by Wako Junyaku Co.) as the dehydrating agent (D) to the coating solution for forming a barrier layer in an amount of 2% by weight with respect to the polyacrylic acid.

Example 19

A laminate was obtained by the same method as that of Example 15 but adding the 2,2'-bis(2-oxazoline) in an amount of 30% by weight and the 3,4-epoxycyclohexylmethyl(3,4-epoxy)cyclohexane carboxylate in an amount of 0.05% by weight with respect to the polyacrylic acid, and, further, adding the methyl orthoformate (manufactured by Wako Junyaku Co.) as the dehydrating agent (D) to the coating solution for forming a barrier layer in an amount of 10% by weight with respect to the polyacrylic acid.

Example 20

A laminate was obtained by the same method as that of Example 15 but adding the 2,2'-bis(2-oxazoline) in an amount of 1% by weight and the 3,4-epoxycyclohexylmethyl(3,4-epoxy)cyclohexane carboxylate in an amount of 1% by weight with respect to the polyacrylic acid, and, further, adding the methyl orthoacetate (manufactured by Wako Junyaku Co.) as the dehydrating agent (D) to the coating solution for forming a barrier layer in an amount of 5% by weight with respect to the polyacrylic acid.

Example 21

A laminate was obtained by the same method as that of Example 15 but adding the 2,2'-bis(2-oxazoline) in an amount of 10% by weight and the 3,4-epoxycyclohexylmethyl(3,4-epoxy)cyclohexane carboxylate in an amount of 0.01% by weight with respect to the polyacrylic acid, and, further, adding the methyl orthoformate (manufactured by Wako Junyaku Co.) as the dehydrating agent (D) to the coating solution for forming a barrier layer in an amount of 20% by weight with respect to the polyacrylic acid.

Example 22

A laminate was obtained by the same method as that of Example 15 but adding, as the compound (B), the polyfunctional alicyclic epoxy resin (Epolead GT-301 manufactured by Daicel Kagaku Kogyo Co.) used in Example 8 in an amount of 0.2% by weight with respect to the polyacrylic acid and, further, adding the methyl orthoformate (manufactured by Wako Junyaku Co.) as the dehydrating agent (D) to the coating solution for forming the barrier layer in an amount of 30% by weight with respect to the polyacrylic acid.

Example 23

A laminate was obtained by the same method as that of Example 15 but without dipping the polyethylene terephthalate film on which the anchor layer and the barrier layer had been formed.

Example 24

A laminate 9 shown in FIG. 2 was obtained by the same method as that of Example 15 but forming the barrier layer 4 directly on the biaxially drawn polyethylene terephthalate film 2 of a thickness of 12 μm without forming the anchor layer.

Example 25

A laminate 10 shown in FIG. 3 was obtained by the same method as that of Example 15 but forming the anchor layer and the barrier layer and, thereafter, successively laminating, on the barrier layer 4 as the surface layer, an urethane-type adhesive 5 of a thickness of 2 μm, a biaxially drawn nylon film 6 of a thickness of 15 μm, an urethane-type adhesive 7 of a thickness of 2 μm and an undrawn polypropylene film 8 of a thickness of 70 μm.

Comparative Example 5

A laminate was obtained by the same method as that of Example 15 but without adding the 3,4-epoxycyclohexylmethyl(3,4-epoxy)cyclohexane carboxylate as the compound (B).

Comparative Example 6

A laminate was obtained by the same method as that of Example 15 but adding the 2,2'-bis(2-oxazoline) as the compound (C) in an amount of 50% by weight without, however, adding the 3,4-epoxycyclohexylmethyl(3,4-epoxy)cyclohexane carboxylate as the compound (B).

Table 3 shows the material constitutions of Examples 15 to 25 and Comparative Examples 5 and 6, and Table 4 shows the measured results of the amounts of oxygen permeation before and after the retort-treatment of the laminates obtained in Examples 15 to 25 and in Comparative Examples 5 and 6. Examples 15 to 25 all demonstrate good barrier properties before and after the retort treatment.

TABLE 3

| | Anchor layer | Polycarboxylic acid polymer (A) | Compound (C) | | Compound (B) | |
|---|---|---|---|---|---|---|
| | | | Kind of compound | Added amount (wt %) | Kind of compound | Added amount (wt %) |
| Ex. 15 | yes | polyacrylic acid | 2,2'-bis(2-oxazoline) | 5 | 3,4-epoxycyclohexylmethyl(3,4-epoxy)cyclohexane carboxylate | 0.2 |
| Ex. 16 | yes | polyacrylic acid | 2,2'-bis(2-oxazoline) | 60 | 3,4-epoxycyclohexylmethyl(3,4-epoxy)cyclohexane carboxylate | 0.05 |
| Ex. 17 | yes | polyacrylic acid | 2,2'-bis(2-oxazoline) | 5 | 3,4-epoxycyclohexylmethyl(3,4-epoxy)cyclohexane carboxylate | 0.2 |
| Ex. 18 | yes | polyacrylic acid | 2,2'-bis(2-oxazoline) | 0.01 | 3,4-epoxycyclohexylmethyl(3,4-epoxy)cyclohexane carboxylate | 0.5 |
| Ex. 19 | yes | polyacrylic acid | 2,2'-bis(2-oxazoline) | 30 | 3,4-epoxycyclohexylmethyl(3,4-epoxy)cyclohexane carboxylate | 0.05 |
| Ex. 20 | yes | polyacrylic acid | 2,2'-bis(2-oxazoline) | 1 | 3,4-epoxycyclohexylmethyl(3,4-epoxy)cyclohexane carboxylate | 1 |

TABLE 3-continued

| | | | | | | |
|---|---|---|---|---|---|---|
| Ex. 21 | yes | polyacrylic acid | 2,2'-bis(2-oxazoline) | 10 | 3,4-epoxycyclohexylmethyl(3,4-epoxy)cyclohexane carboxylate | 0.01 |
| Ex. 22 | yes | polyacrylic acid | 2,2'-bis(2-oxazoline) | 5 | polyfunctional alicyclic epoxy resin | 0.2 |
| Ex. 23 | yes | polyacrylic acid | 2,2'-bis(2-oxazoline) | 5 | 3,4-epoxycyclohexylmethyl(3,4-epoxy)cyclohexane carboxylate | 0.2 |
| Ex. 24 | no | polymethacrylic acid | 2,2'-bis(2-oxazoline) | 5 | 3,4-epoxycyclohexylmethyl(3,4-epoxy)cyclohexane carboxylate | 0.2 |
| Ex. 25 | yes | polyacrylic acid | 2,2'-bis(2-oxazoline) | 5 | 3,4-epoxycyclohexylmethyl(3,4-epoxy)cyclohexane carboxylate | 0.2 |
| Comp. Ex. 5 | yes | polyacrylic acid | 2,2'-bis(2-oxazoline) | 5 | — | — |
| Comp. Ex. 6 | yes | polyacrylic acid | 2,2'-bis(2-oxazoline) | 50 | — | — |

| | Dehydrating agent (D) | | Heat treatment of barrier layer | |
|---|---|---|---|---|
| | Kind of compound | Added amount (wt %) | Treating conditions | Remarks |
| Ex. 15 | — | — | 100° C. - 5 sec. 140° C. - 20 sec. | |
| Ex. 16 | — | — | 100° C. - 5 sec. 140° C. - 20 sec. | |
| Ex. 17 | methyl orthoformate | 30 | 100° C. - 5 sec. 140° C. - 20 sec. | |
| Ex. 18 | methyl orthoformate | 2 | 100° C. - 5 sec. 140° C. - 20 sec. | |
| Ex. 19 | methyl orthoformate | 10 | 100° C. - 5 sec. 140° C. - 20 sec. | |
| Ex. 20 | methyl orthoacetate | 5 | 100° C. - 5 sec. 140° C. - 20 sec. | |
| Ex. 21 | methyl orthoformate | 20 | 100° C. - 5 sec. 140° C. - 20 sec. | |
| Ex. 22 | methyl orthoformate | 30 | 100° C. - 5 sec. 140° C. - 20 sec. | |
| Ex. 23 | — | — | 100° C. - 5 sec. 140° C. - 20 sec. | not dipped |
| Ex. 24 | — | — | 100° C. - 5 sec. 140° C. - 20 sec. | without anchor layer |
| Ex. 25 | — | — | 100° C. - 5 sec. 140° C. - 20 sec. | barrier layer as surface layer |
| Comp. Ex. 5 | — | — | 100° C. - 5 sec. 140° C. - 20 sec. | |
| Comp. Ex. 6 | — | — | 100° C. - 5 sec. 140° C. - 20 sec. | |

TABLE 4

| | Extractability with methanol (%) | | Position of barrier layer in the laminate | Amount of oxygen permeation (heat-treated at 100° C.) ($cm^3/m^2 \cdot day \cdot atm$) | | Amount of oxygen permeation (heat-treated at 140° C.) ($cm^3/m^2 \cdot day \cdot atm$) | |
|---|---|---|---|---|---|---|---|
| | 100° C. - 8 sec. | 140° C. - 20 sec. | | Before retorting | After retorting | Before retorting | After retorting |
| Ex. 15 | 9.6 | 0.9 | lower layer | 0.06 | 0.83 | 0.05 | 0.75 |
| Ex. 16 | 19.2 | 3.2 | lower layer | 0.81 | 6.4 | 0.48 | 5.3 |
| Ex. 17 | 8.2 | <0.5 | lower layer | 0.03 | 0.66 | 0.02 | 0.59 |
| Ex. 18 | 6.5 | <0.5 | lower layer | 0.01 | 0.33 | 0.01 | 0.27 |
| Ex. 19 | 16.1 | 2.5 | lower layer | 0.53 | 6.2 | 0.26 | 3.8 |
| Ex. 20 | 3.2 | <0.5 | lower layer | 0.03 | 0.98 | 0.02 | 0.80 |
| Ex. 21 | 18.6 | 4.5 | lower layer | 0.61 | 4.2 | 0.01 | 0.68 |
| Ex. 22 | 11.3 | 4.5 | lower layer | 1.20 | 9.8 | 0.95 | 9.0 |
| Ex. 23 | 9.6 | 0.9 | lower layer | 1 | 9.6 | 0.91 | 5.2 |
| Ex. 24 | 9.4 | 1.2 | lower layer | 0.07 | 0.91 | 0.06 | 0.80 |
| Ex. 25 | 9.6 | 0.9 | surface layer | 0.18 | 0.79 | 0.11 | 0.74 |
| Comp. Ex. 5 | 73 | 20 | lower layer | Dissolved while being dipped | — | 0.15 | 0.98 |
| Comp. | 33.4 | 5.4 | lower layer | Dissolved while | — | 0.45 | 4.9 |

TABLE 4-continued

|  | Extractability with methanol (%) | | Position of barrier layer in the laminate | Amount of oxygen permeation (heat-treated at 100° C.) (cm³/m²·day·atm) | | Amount of oxygen permeation (heat-treated at 140° C.) (cm³/m²·day·atm) | |
|---|---|---|---|---|---|---|---|
|  | 100° C. - 8 sec. | 140° C. - 20 sec. |  | Before retorting | After retorting | Before retorting | After retorting |
| Ex. 6 (Ref.) |  |  | being dipped |  |  |  |  |
| Laminate without barrier layer | — | — | — | 70 | 130 | 70 | 130 |

The invention claimed is:

1. A composition for forming a gas-barrier material, comprising a polycarboxylic acid-type polymer (A) and an alicyclic epoxy compound (B) represented by the following formula (1)

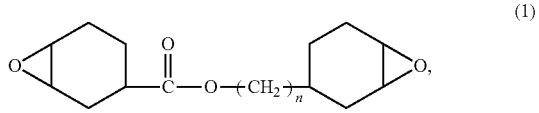

(1)

wherein said alicyclic epoxy compound (B) is contained in an amount of 0.1 to 1 part by weight per 100 parts by weight of said polycarboxylic acid-type polymer (A).

2. The composition for forming a gas-barrier material according to claim 1, wherein said polycarboxylic acid-type polymer (A) is a poly(meth)acrylic acid or a partly neutralized product thereof.

3. The composition for forming a gas-barrier material according to claim 1, wherein said alicyclic. epoxy compound (B) is a compound having an epoxycyclohexyl group.

4. The composition for forming a gas-barrier material according to claim 1, further comprising a compound (C) which forms an ether bond with a carbon atom that is forming a double bond with a nitrogen atom, and has two ring structures (c) including an oxygen atom in the ether bond.

5. The composition for forming a gas-barrier material according to claim 4, wherein the compound (B) is contained in an amount of 0.01 to 20 parts by weight and the compound (C) is contained in an amount of 0.01 to 60 parts by weight per 100 parts by weight of the polycarboxylic acid-type polymer (A).

6. The composition for forming a gas-barrier material according to claim 4, wherein said compound (C) is a 2,2'-bis(2-oxazoline).

7. The composition for forming a gas-barrier material according to claim 4, wherein a dehydrating agent (D) is contained in an amount of 1 to 100 parts by weight per 100 parts by weight of said polycarboxylic acid-type polymer (A).

8. The composition for forming a gas-barrier material according to claim 7, wherein said dehydrating agent (D) is a methyl orthoformate and/or a methyl orthoacetate.

9. A gas-barrier material comprising the composition for forming a gas-barrier material of claim 4 and in which a cross linked structure is formed by the reaction of a carboxyl group of the carboxylic acid-type polymer (A) in the composition for forming a gas-barrier material with an epoxy group of the alicyclic epoxy compound (B) and with the ring structures (c) of the compound (C).

10. The gas-barrier material according to claim 9, wherein two ester bonds stemming from the epoxycyclohexyl group or two amido ester bonds are formed at the crosslinked portion in the crosslinked structure.

11. The gas-barrier material according to claim 9, wherein the remaining unreacted carboxyl groups are metal ionically crosslinked with polyvalent metal ions.

12. A method of producing a gas-barrier material by treating the gas-barrier material of claim 9 with water containing a polyvalent metal compound so that the remaining unreacted carboxyl groups are metal ionically crosslinked.

13. A packing material having a layer of the gas-barrier material of claim 9 formed on the surface of a plastic base material or between the plastic layers.

14. The packing material according to claim 13, wherein the layer of said gas-barrier material is formed on the surface of the plastic base material via an anchor layer or at least one surface thereof is formed between the plastic layers via the anchor layer.

15. The packing material according to claim 14, wherein said anchor layer contains an urethane-type polymer.

16. A gas-barrier material comprising the composition for forming a gas-barrier material of claim 1 and in which a crosslinked structure is formed by the reaction of a carboxyl group of the carboxylic acid-type polymer (A) in the composition for forming a gas-barrier material with an epoxy group of the alicyclic epoxy compound (B).

17. The gas-barrier material according to claim 16, wherein two ester bonds stemming from the alicyclic epoxy group are formed at the crosslinked portion in said crosslinked structure.

18. The gas-barrier material according to claim 16, wherein the ester bonds stemming from said alicyclic epoxy group are the ones stemming from an epoxycyclohexyl group.

19. The gas-barrier material according to claim 16, wherein the remaining unreacted carboxyl groups are metal ionically crosslinked with polyvalent metal ions.

20. A method of producing a gas-barrier material by treating the gas-barrier material of claim 16 with water containing a polyvalent metal compound so that the remaining unreacted carboxyl groups are metal ionically crosslinked.

21. A packing material having a layer of the gas-barrier material of claim 16 formed on the surface of a plastic base material or between the plastic layers.

22. The packing material according to claim 21, wherein the layer of said gas-barrier material is formed on the surface of the plastic base material via an anchor layer or at least one surface thereof is formed between the plastic layers via the anchor layer.

23. The packing material according to claim 22, wherein said anchor layer contains an urethane-type polymer.

* * * * *